US012014104B2

(12) United States Patent
Jin et al.

(10) Patent No.: US 12,014,104 B2
(45) Date of Patent: Jun. 18, 2024

(54) FOLDABLE ELECTRONIC DEVICE FOR CONTROLLING SCREEN ROTATION, AND OPERATING METHOD THEREFOR

(71) Applicant: SAMSUNG ELECTRONICS CO., LTD., Suwon-si (KR)

(72) Inventors: Seoyoung Jin, Suwon-si (KR); Oheon Kwon, Suwon-si (KR); Changhuyn Sung, Suwon-si (KR); Seongsig Kang, Suwon-si (KR); Wonhee Lee, Suwon-si (KR); Jeongmin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/105,084

(22) Filed: Feb. 2, 2023

(65) Prior Publication Data
US 2023/0176803 A1     Jun. 8, 2023

Related U.S. Application Data

(63) Continuation of application No. PCT/KR2021/009244, filed on Jul. 19, 2021.

(30) Foreign Application Priority Data

Aug. 4, 2020 (KR) ........................ 10-2020-0097145

(51) Int. Cl.
*G06F 3/14* (2006.01)
*G06F 3/0346* (2013.01)
(Continued)

(52) U.S. Cl.
CPC .......... *G06F 3/1446* (2013.01); *G06F 3/0346* (2013.01); *H04M 1/0216* (2013.01);
(Continued)

(58) Field of Classification Search
CPC .... G06F 1/1618; G06F 1/1641; G06F 1/1647; G06F 1/1652; G06F 1/1677;
(Continued)

(56) References Cited

U.S. PATENT DOCUMENTS 9,348,504 B2   5/2016   Kwak et al.
9,412,341 B2   8/2016   Lin
(Continued)

FOREIGN PATENT DOCUMENTS

KR   10-2004-0040000 A   5/2004
KR   10-2007-0041224 A   4/2007
(Continued)

OTHER PUBLICATIONS

International Search Report dated Oct. 22, 2021, issued by the International Searching Authority in International Application No. PCT/KR2021/009244 (PCT/ISA/210).
(Continued)

*Primary Examiner* — Nelson M Rosario
(74) *Attorney, Agent, or Firm* — Sughrue Mion, PLLC

(57) ABSTRACT

An electronic device includes a hinge structure, a first housing, second housing foldably connected to the hinge structure and configured to be foldable with respect to the first housing, a first display disposed from at least a part of a first surface to at least a part of a third surface, a second display, a first sensor configured to collect sensor data related to movement of the first housing, a second sensor configured to collect sensor data related to movement of the second housing, and a processor operatively connected with the first display, the second display, the first sensor, and the second sensor. The processor is configured to identify a folding angle between the first housing and the second housing by using the first sensor and the second sensor.

15 Claims, 25 Drawing Sheets

(51) Int. Cl.
H04M 1/02 (2006.01)
H04M 1/72454 (2021.01)

(52) U.S. Cl.
CPC ...... H04M 1/0268 (2013.01); H04M 1/72454 (2021.01); *H04M 2250/12* (2013.01)

(58) Field of Classification Search
CPC ...... G06F 1/1681; G06F 1/3206; G06F 1/325; G06F 1/3265; G06F 3/0346; G06F 3/038; G06F 3/0484; G06F 3/0488; G06F 3/1431; G06F 3/1446; G06F 3/147; G06F 2200/1614; G06F 2200/1637; G09G 3/035; G09G 5/00; G09G 2340/14; G09G 2380/02; H04M 1/0214; H04M 1/0216; H04M 1/0243; H04M 1/0268; H04M 1/72454; H04M 2250/12
See application file for complete search history.

(56) References Cited

U.S. PATENT DOCUMENTS

| | | |
|---|---|---|
| 9,430,184 B2 | 8/2016 | Cho et al. |
| 9,558,709 B2 | 1/2017 | Zhou |
| 10,394,371 B2 | 8/2019 | Kim et al. |
| 10,403,241 B2 | 9/2019 | Kim et al. |
| 2004/0084578 A1 | 5/2004 | Cho et al. |
| 2008/0253073 A1 | 10/2008 | Kee et al. |
| 2010/0060664 A1 | 3/2010 | Kilpatrick, II et al. |
| 2016/0026381 A1* | 1/2016 | Kim .................. G06F 3/04817 715/761 |
| 2016/0132074 A1 | 5/2016 | Kim et al. |
| 2017/0206049 A1* | 7/2017 | Choi .................. G06F 1/1641 |
| 2019/0018454 A1* | 1/2019 | Jung .................. G06F 1/1652 |
| 2019/0138179 A1 | 5/2019 | Xia |
| 2020/0225706 A1 | 7/2020 | Jung et al. |
| 2020/0249898 A1 | 8/2020 | Ko et al. |
| 2021/0398465 A1 | 12/2021 | Kim et al. |

FOREIGN PATENT DOCUMENTS

| | | |
|---|---|---|
| KR | 10-2008-0093340 A | 10/2008 |
| KR | 10-2011-0066165 A | 6/2011 |
| KR | 10-2016-0012779 A | 2/2016 |
| KR | 10-2016-0055646 A | 5/2016 |
| KR | 10-2017-0085317 A | 7/2017 |
| KR | 10-2018-0089229 A | 8/2018 |
| KR | 10-2018-0132847 A | 12/2018 |
| KR | 10-2020-0026654 A | 3/2020 |
| KR | 10-2020-0045241 A | 5/2020 |
| KR | 10-2020-0086830 A | 7/2020 |

OTHER PUBLICATIONS

Written Opinion dated Oct. 22, 2021, issued by the International Searching Authority in International Application No. PCT/KR2021/009244 (PCT/ISA/237).
Communication issued Nov. 10, 2023 by the European Patent Office in European Patent Application No. 21854226.4.

* cited by examiner

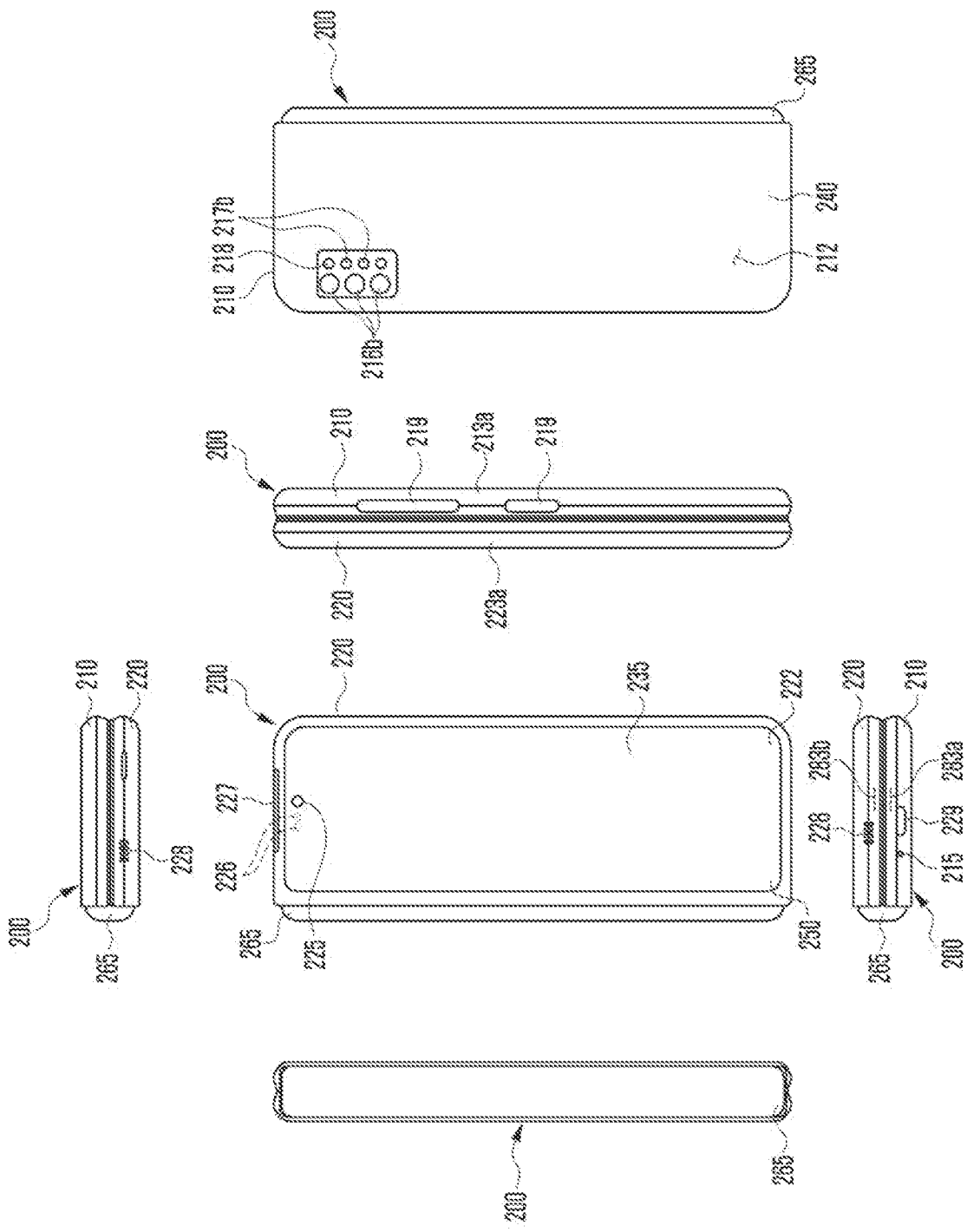

FOLDABLE ELECTRONIC DEVICE FOR CONTROLLING SCREEN ROTATION, AND OPERATING METHOD THEREFOR

CROSS-REFERENCE TO RELATED APPLICATIONS

This application is a continuation application of International Application No. PCT/KR2021/009244, filed Jul. 19, 2021, which is based on and claims priority to Korean Patent Application No. 10-2020-0097145, filed on Aug. 4, 2020, in the Korean Intellectual Property Office, the disclosures of which are incorporated by reference herein in their entireties.

BACKGROUND

1. Field

The disclosure relates to a device and a method for controlling screen rotation in a foldable electronic device.

2. Description of Related Art

Electronic devices are gradually becoming slimmer and are being improved to enhance design aspects and differentiate functional elements thereof. These electronic devices are gradually being transformed into various shapes apart from a uniform rectangular shape. For example, an electronic device may have a transformable structure capable of adjusting the size of a display to satisfy portability and usability of the electronic device. An electronic device having a transformable structure may include a foldable electronic device that operates in a manner in which at least two housings are folded or unfolded with respect to each other.

A foldable electronic device may operate in an in-folding, out-folding, in/out-folding, sliding, and/or rolling manner through rotation of a first housing and a second housing with respect to each other via a hinge module.

In the foldable electronic device, since the first housing and the second housing rotate via the hinge module, a structure of a display disposed to cross the first housing and the second housing may be transformed into various shapes. A user of the foldable electronic device may view a content displayed on the display in a different direction according to various shapes of the display.

The foldable electronic device requires a method for controlling screen rotation based on various shapes of a display.

SUMMARY

Provided are a device and a method for controlling screen rotation in a foldable electronic device.

According to an aspect of the disclosure, an electronic device includes: a first housing including a first surface, a second surface opposite to the first surface, and a first lateral surface surrounding a first space between the first surface and the second surface; a second housing including a third surface, a fourth surface opposite to the third surface, and a second lateral surface surrounding a second space between the third surface and the fourth surface; a hinge structure foldably connecting the first housing and the second housing to each other such that the first surface and the third surface face a same direction when the first housing and the second housing are in an unfolded state; a first display disposed from at least a part of the first surface to at least a part of the third surface; a second display disposed in the second space so as to be visible from an outside through at least a part of the fourth surface; a first sensor disposed at least partly in the first space and configured to obtain sensor data related to movement of the first housing; a second sensor disposed at least partly in the second space and configured to obtain sensor data related to movement of the second housing; and a processor operatively connected with the first display, the second display, the first sensor, and the second sensor, wherein the processor is configured to: identify a folding angle between the first housing and the second housing by using the first sensor and the second sensor, select the second display based on the folding angle between the first housing and the second housing being in a first range, determine a display direction of a content, based on the sensor data obtained by the second sensor, and control the second display to display the content, based on the display direction of the content.

The electronic device may further include a magnetic detection sensor disposed in the first space or the second space, and the processor may be further configured to: based on at least one of the first display and the second display being in an active state, identify the folding angle between the first housing and the second housing by using the first sensor, the second sensor, and the magnetic detection sensor; and based on the first display and the second display being in an inactive state, identify the folding angle between the first housing and the second housing by using at least one of a part of the first sensor and a part of the second sensor.

At least one of the first sensor and the second sensor may include an acceleration sensor and a gyro sensor, and the at least one of the part of the first sensor or the part of the second sensor includes the acceleration sensor.

The processor may be further configured to: based on the first housing and the second housing being in a folded state, select the second display; determine the display direction of the content, based on the sensor data obtained by the first sensor; and control the second display to display the content, based on the display direction of the content.

The processor may be further configured to: the first housing and the second housing are in the unfolded state, select the first display; determine the display direction of the content, based on at least one the sensor data obtained by the first sensor and the sensor data obtained by the second sensor; and control the first display to display the content, based on the display direction of the content.

The processor may be further configured to: based on the first display being in an active state and the first housing and the second housing being in the unfolded state, determine the display direction of the content based on the sensor data obtained by the first sensor and the sensor data obtained by the second sensor; and based on the first display being in an inactive state and the first housing and the second housing being in the unfolded state, determine the display direction of the content based on at least one the sensor data obtained by the first sensor and the sensor data obtained by the second sensor.

The processor may be further configured to: select the first display based on the folding angle between the first housing and the second housing being in a second range different from the first range; determine the display direction of the content, based on at least one of the sensor data obtained by the first sensor and the sensor data obtained by the second sensor; and control the first display to display the content, based on the display direction of the content.

The processor may be further configured to: based on the sensor data obtained by the first sensor satisfying a first condition, determine the display direction of the content based on the sensor data obtained by the second sensor; and based on the sensor data obtained by the second sensor satisfying the first condition, determine the display direction of the content based on the sensor data obtained by the first sensor.

The processor may be further configured to, based on the sensor data obtained by the first sensor and the sensor data obtained by the second sensor not satisfying the first condition, determine the display direction of the content, based on the sensor data obtained by the first sensor and the sensor data obtained by the second sensor.

According to an aspect of the disclosure, an operation method of an electronic device including a first housing, a second housing, and a hinge structure foldably connecting the first housing and the second housing, includes: identifying, by a first sensor and a second sensor, a folding angle between the first housing and the second housing, the first sensor being disposed in a first space of the first housing which includes a first surface, a second surface facing a direction opposite to the first surface, and a first lateral surface surrounding the first space between the first surface and the second surface, the second sensor being disposed in a second space of the second housing which includes a third surface facing a same direction as the first surface when the first housing and the second housing are in an unfolded state, a fourth surface opposite to the third surface, and a second lateral surface surrounding the second space between the third surface and the fourth surface; based on the folding angle between the first housing and the second housing satisfying a first range, selecting a second display from among a first display disposed from at least a part of the first surface to at least a part of the third surface, and the second display disposed in the second space so as to be visible from an outside through at least a part of the fourth surface; determining a display direction of a content, based on sensor data obtained by the second sensor; and displaying the content on the second display, based on the display direction of the content.

The identifying the folding angle may include: based on at least one of the first display and the second display being in an active state, identifying the folding angle between the first housing and the second housing by using the first sensor, the second sensor, and a magnetic detection sensor; and based on the first display and the second being are in an inactive state, identifying the folding angle between the first housing and the second housing through at least one of a part of the first sensor and a part of the second sensor.

At least one of the first sensor and the second sensor may include an acceleration sensor and a gyro sensor, and at least one of the part of the first sensor or the part of the second sensor includes the acceleration sensor.

The operation method may further include: based on the first housing and the second housing being in a folded state, selecting the second display; determining the display direction of the content, based on sensor data on the sensor data obtained by the first sensor; and displaying the content on the second display, based on the display direction of the content.

The operation method may further include: based on the first housing and the second housing being in the unfolded state, selecting the first; determining the display direction of the content, based on sensor data on the sensor data obtained by at least one of the first sensor and the second sensor; and displaying the content on the first display, based on the display direction of the content.

The operation method may further include: selecting the first display when the folding angle between the first housing and the second housing is in a second range different from the first range; determining the display direction of the content, based on sensor data obtained by at least one of the first sensor and the second sensor; and displaying the content on the first display, based on the display direction of the content.

BRIEF DESCRIPTION OF DRAWINGS

The above and other aspects, features, and advantages of the present disclosure will be more apparent from the following detailed description of embodiments, taken in conjunction with the accompanying drawings, in which:

FIG. 2B illustrates a folded state of an electronic device according to various embodiments;

DETAILED DESCRIPTION

Hereinafter, various embodiments will be described in detail with reference to the accompanying drawings.

Figure 1:
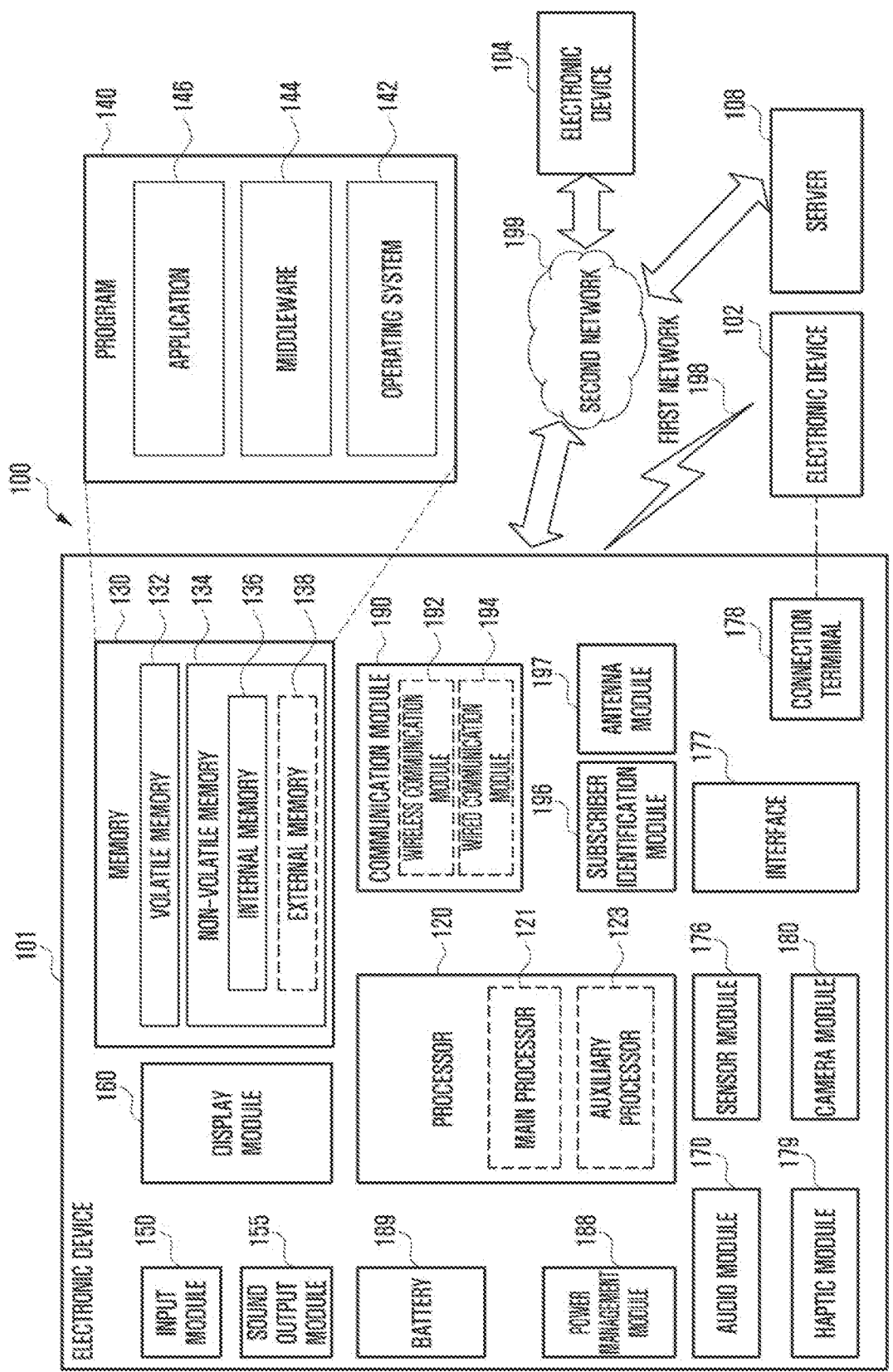
FIG. 1 is a block diagram of an electronic device, according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. According to an embodiment, the subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
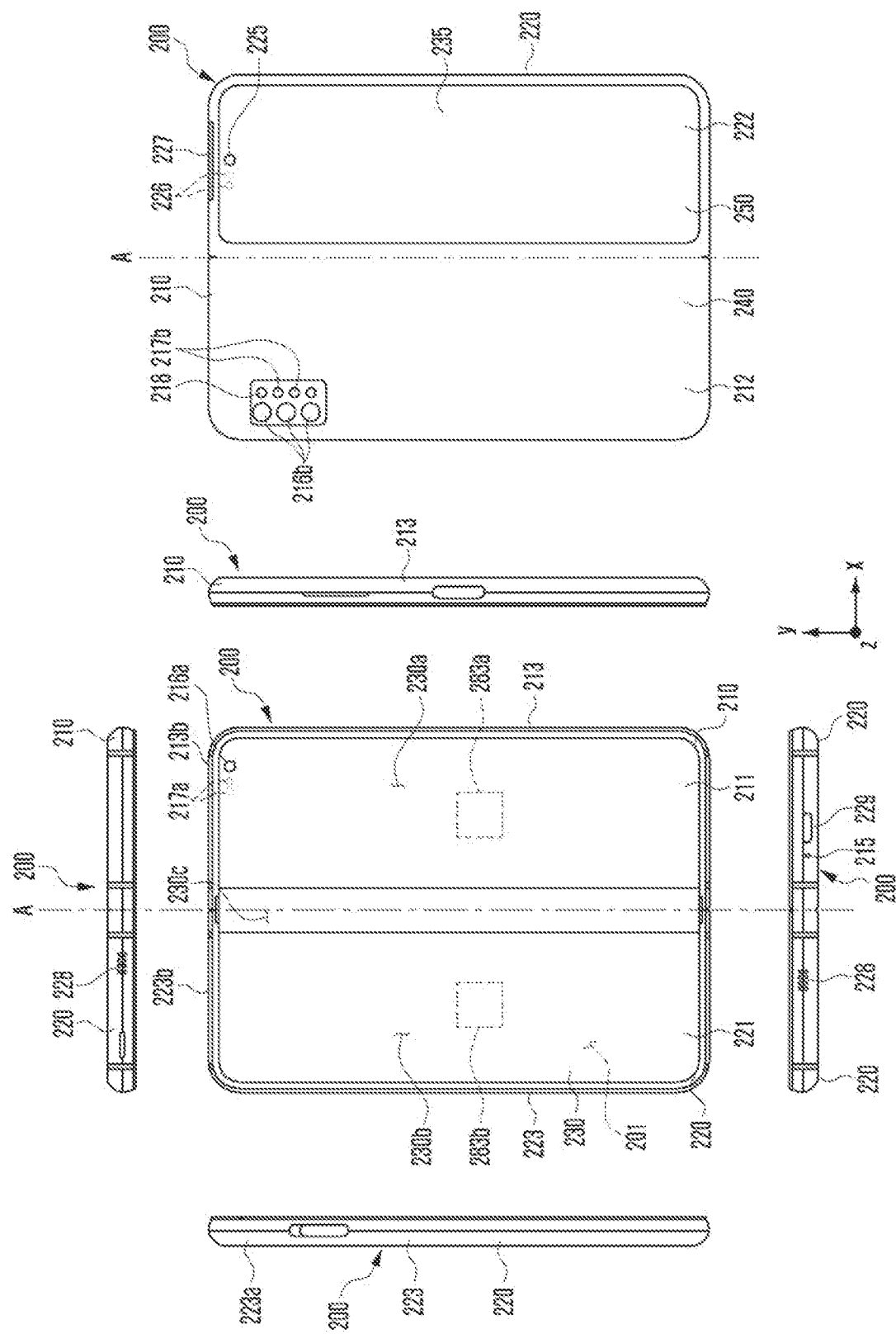
FIG. 2A illustrates an unfolded state of an electronic device according to various embodiments.
Figure 2C:
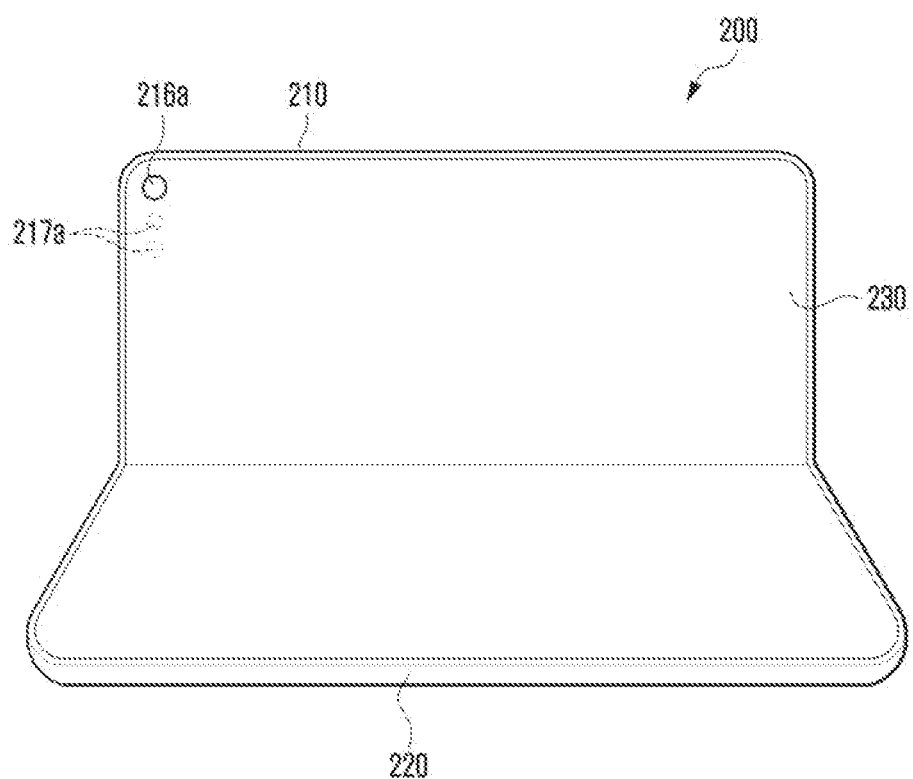
FIG. 2C illustrates an intermediate state of an electronic device according to various embodiments.

FIG. 2A illustrates an unfolded state of an electronic device 200 according to various embodiments. FIG. 2B illustrates a folded state of the electronic device 200 according to various embodiments. FIG. 2C illustrates an intermediate state of the electronic device 200 according to various embodiments. The electronic device 200 of FIGS. 2A, 2B, and 2C may be, for example, at least partially similar to the electronic device 101 of FIG. 1, may include features of the electronic device 101, may be used in conjunction with other features and systems similar to the electronic device 101 shown in FIG. 1 or may include other embodiments of the electronic device.

Referring to FIGS. 2A, 2B, and 2C, the electronic device 200 may include a pair of housings 210 and 220 (e.g., a foldable housing) rotatably or foldably coupled through a hinge structure or hinge module (e.g., a hinge module 264 of FIG. 2D) so that they can be folded with respect to each other. The electronic device 200 may include a first display 230 (e.g., a flexible display, a foldable display, or a main display) and a second display 235 (e.g., a sub display) which are disposed through the pair of housings 210 and 220. According to an embodiment, the hinge module (e.g., the hinge module 264 of FIG. 2D) may be disposed to be visible from the outside through a first housing 210 and a second housing 220, in a folded state, and may be disposed to be invisible from the outside through a hinge cover 265 which protects the hinge module 264 and covers a foldable part, in an unfolded state. A surface on which the first display 230 is disposed may be defined as a front surface of the electronic device 200, and an opposite surface of the front surface may be defined as a rear surface of the electronic device 200. In addition, a surface surrounding the space between the front surface and the rear surface may be defined as a lateral surface of the electronic device 200.

Figure 2D:
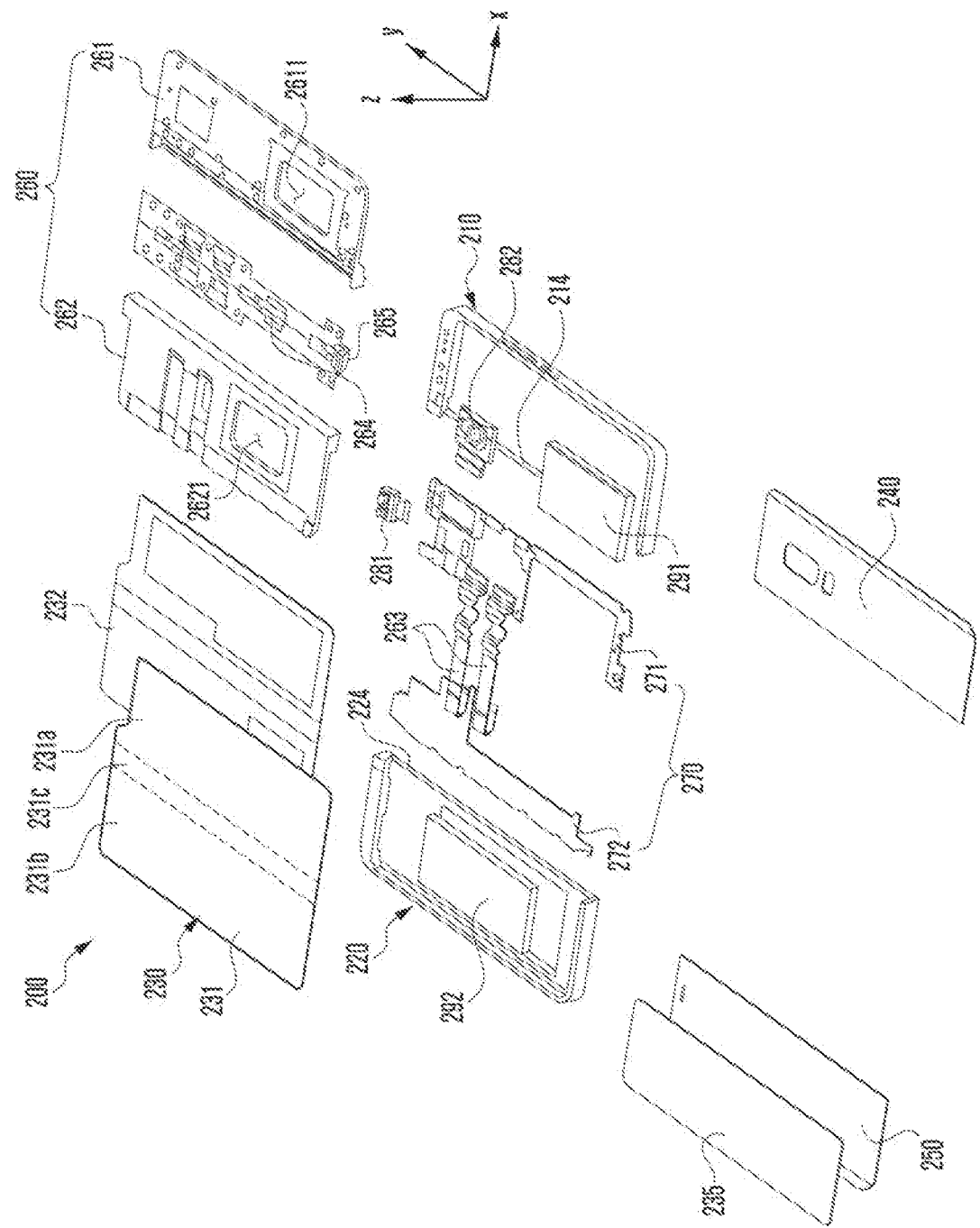
FIG. 2D is an exploded perspective view of an electronic device according to various embodiments.

According to various embodiments, the pair of housings 210 and 220 may include the first housing 210 and the second housing 220 configured to be foldable with respect to each other through the hinge module (e.g., the hinge module 264 of FIG. 2D). According to an embodiment, the pair of housings 210 and 220 are not limited to the shape and coupling shown in FIGS. 2A, 2B, and 2C and may be implemented by a combination and/or coupling of other shapes or components. According to an embodiment, the first housing 210 and the second housing 220 may be disposed on opposite sides with respect to a folding axis (A axis), and may have an overall symmetrical shape with respect to the folding axis (A axis). According to an embodiment, the first housing 210 and the second housing 220 may be folded asymmetrically with reference to the folding axis. According to an embodiment, an angle or distance between the first housing 210 and the second housing 220 may be changed depending on whether the electronic device 200 is in an unfolded state, a folded state, or an intermediate state.

According to an embodiment, the first housing 210 may be connected to the hinge module (e.g., the hinge module 264 of FIG. 2D) in the unfolded state of the electronic device 200, and include a first surface 211 disposed to face the front surface of the electronic device 200, a second surface 212 facing a direction opposite to the first surface 211, and a first lateral member 213 surrounding at least a part of a first space between the first surface 211 and the second surface 212. According to an embodiment, the second housing 220 may be connected to the hinge module (e.g., the hinge module 264 of FIG. 2D) in an unfolded state of the electronic device 200, and include a third surface 221 disposed to face the front surface of the electronic device 200, a fourth surface 222 facing a direction opposite to the third surface 221, and a second lateral member 223 surrounding at least a part of a second space between the third surface 221 and the fourth surface 222. According to an embodiment, the first surface 211 may face the same direction as the third surface 221 in the unfolded state, and face the third surface 221 in the folded state. Although not shown, according to another embodiment, the first surface 211 may be disposed to face the opposite direction of the third surface 221 in the folded state. According to an embodiment, the electronic device 200 may include a recess 201 formed to receive the first display 230 via structural coupling of the first housing 210 and the second housing 220. According to an embodiment, the recess 201 may have substantially the same size as the first display 230.

According to various embodiments, the hinge cover 265 may be disposed between the first housing 210 and the second housing 220 to cover the hinge module (e.g., the hinge module 264 of FIG. 2D). According to an embodiment, the hinge cover 265 may be covered by parts of the first housing 210 and the second housing 220 or exposed to the outside depending on whether the electronic device is in an unfolded state, a folded state, or an intermediate state. For example, when the electronic device 200 is in the unfolded state, the hinge cover 265 may be not exposed since the hinge cover is covered by the first housing 210 and the second housing 220. According to an embodiment, when the electronic device 200 is in the folded state such that the first surface 211 of the first housing 210 and the third surface 221 of the second housing 220 face each other, the hinge cover 265 may be exposed to the outside between the first housing 210 and the second housing 220. According to an embodiment, when the electronic device is in the intermediate state in which the first housing 210 and the second housing 220 are folded with a certain angle, the hinge cover 265 may be at least partially exposed to the outside of the electronic device 200 between the first housing 210 and the second housing 220. For example, an area where the hinge cover 265 is exposed to the outside may be smaller than an area of the hinge cover 265 that is exposed when the electronic device 200 is in a completely folded state. Although not shown, according to another embodiment, when the electronic device 200 is in the folded state such that the second surface 212 of the first housing 210 and the fourth surface 222 of the second housing 220 face each other, the hinge cover 265 may be not exposed to the outside between the first housing 210 and the second housing 220. In an embodiment, the hinge cover 265 may include a curved surface.

According to various embodiments, when the electronic device 200 is in the unfolded state (e.g., the state of FIG. 2A), the first housing 210 and the second housing 220 form an angle of 180 degrees, and a first area 230*a*, a folding area 230*c*, and a second area 230*b* of the first display 230 may be on the same plane and may be disposed to face the same direction.

In an embodiment, when the electronic device 200 is in the folded state (e.g., the state of FIG. 2B), the first surface 211 of the first housing 210 and the third surface 221 of the second housing 220 may be disposed to face each other (an in-folding manner). In an embodiment, the first area 230*a* and the second area 230*b* of the first display 230 may form a narrow angle (e.g., a range of from about 0 degrees to about 10 degrees) through the folding area 230*c*, and may be disposed to face each other. According to an embodiment, at least a part of the folding area 230*c* may be configured to have a curved surface having a predetermined curvature. In another embodiment, when the electronic device 200 is in the folded state, the first housing 210 and the second housing 220 may rotate with respect to each other by an angle of 360 degrees to be reversely folded so that the second surface 212 and the fourth surface 222 face each other (an out-folding manner).

According to an embodiment, when the electronic device 200 is in the intermediate state (e.g., the state of FIG. 2C), the first housing 210 and the second housing 220 may be disposed at a certain angle to each other. In this case, the first area 230*a* and the second area 230*b* of the first display 230 may form an angle greater than that in the folded state and smaller than that in the unfolded state, and the curvature of the folding area 230*c* may be smaller than that in the folded state. In an embodiment, the first housing 210 and the second housing 220 may be configured to be capable of stopping at a designated folding angle between the folded state and the unfolded state, through the hinge module (e.g., the hinge module 264 of FIG. 2D) (a free stop function). In an embodiment, the first housing 210 and the second housing 220 may operate while being pressed in an unfolding direction or a folding direction with reference to a designated inflection angle, through the hinge module (e.g., the hinge module 264 of FIG. 2D).

According to various embodiments, the electronic device 200 may include at least one of at least one display 230 and 235 disposed in the first housing 210 and/or the second housing 220, an input device 215, sound output device 227 and 228, sensor modules 217*a*, 217*b*, and 226, camera modules 216*a*, 216*b*, and 225, a key input device 219, an indicator (not shown), or a connector port 229. In an embodiment, the electronic device 200 may omit at least one of the components or may additionally include at least one other component.

According to various embodiments, the at least one display 230 and 235 may include the first display 230 (e.g., a flexible display) disposed to be supported by the third surface 221 of the second housing 220 from the first surface 211 of the first housing 210 through the hinge module (e.g., the hinge module 264 of FIG. 2D), and the second display 235 disposed to be visible from the outside through the fourth surface 222 in an inner space of the second housing 220. According to an embodiment, the first display 230 may be mainly used in the unfolded state of the electronic device 200, and the second display 235 may be mainly used in the folded state of the electronic device 200. According to an embodiment, in the case of the intermediate state, the electronic device 200 may use the first display 230 or the second display 235, based on a folding angle between the first housing 210 and the second housing 220.

According to various embodiments, the first display 230 may be disposed in a space formed by the pair of housings 210 and 220. For example, the first display 230 may be seated in the recess 201 formed by the pair of housings 210 and 220, and may be disposed to occupy substantially most of the front surface of the electronic device 200. According to an embodiment, the first display 230 may include a flexible display in which at least a partial area thereof may be transformed into a flat or curved surface. According to an embodiment, the first display 230 may include the first area 230*a* facing the first housing 210, the second area 230*b* facing the second housing 220, and the folding area 230*c* which connects the first area 230*a* and the second area 230*b* and faces the hinge module (e.g., the hinge module 264 of FIG. 2D). According to an embodiment, the area division of the first display 230 is only an exemplary physical division by the pair of housings 210 and 220 and the hinge module (e.g., the hinge module 264 of FIG. 2D), and substantially, the first display 230 may be seamlessly displayed as one entire screen through the pair of housings 210 and 220 and the hinge module (e.g., the hinge module 264 of FIG. 2D). According to an embodiment, the first area 230*a* and the second area 230*b* may have a generally symmetrical shape or a partially asymmetrical shape with reference to the folding area 230*c*.

According to various embodiments, the electronic device 200 may include a first rear cover 240 disposed on the second surface 212 of the first housing 210, and a second rear cover 250 disposed on the fourth surface 222 of the second housing 220. In an embodiment, at least a part of the first rear cover 240 may be integrally configured with the first lateral member 213. In an embodiment, at least a part of the second rear cover 250 may be integrally configured with the second lateral member 223. According to an embodiment, at least one of the first rear cover 240 and the second rear cover 250 may be configured through a substantially transparent plate (e.g., a polymer plate or a glass plate including various coating layers) or an opaque plate. According to an embodiment, the first rear cover 240 may be formed of, for example, an opaque plate such as coated or colored glass, ceramic, a polymer, a metal (e.g., aluminum, stainless steel (STS), or magnesium), or a combination of at least two of the materials. According to an embodiment, the second rear cover 250 may be formed through, for example, a substantially transparent plate such as glass or polymer. Accordingly, the second display 235 may be disposed to be visible from the outside through the second rear cover 250 in the inner space of the second housing 220.

According to various embodiments, the input device 215 may include a microphone 215. In an embodiment, the input device 215 may include a plurality of microphones 215 disposed to detect the direction of sound. According to an embodiment, the sound output devices 227 and 228 may include speakers 227 and 228. According to an embodiment, the speakers 227 and 228 may include a call receiver 227 disposed through the fourth surface 222 of the second housing 220, and an external speaker 228 disposed through the lateral member of the second housing 220. In an embodiment, the microphone 215, the speakers 227 and 228, and the connector port 229 may be disposed in spaces of the first housing 210 and/or the second housing 220, and may be exposed to an external environment through at least one hole formed in the first housing 210 and/or the second housing 220. In an embodiment, holes formed in the first housing 210 and/or the second housing 220 may be commonly used for the microphone 215 and the speakers 227 and 228. In an embodiment, the sound output devices 227 and 228 may include a speaker (e.g., a piezo speaker) which operates while excluding the hole formed in the first housing 210 and/or the second housing 220.

According to various embodiments, the camera modules 216a, 216b, and 225 may include a first camera device 216a disposed on the first surface 211 of the first housing 210, a second camera device 216b disposed on the second surface 212 of the first housing 210, and/or a third camera device 225 disposed on the fourth surface 222 of the second housing 220. According to an embodiment, the electronic device 200 may include a flash 218 disposed near the second camera device 216b. According to an embodiment, the flash 218 may include, for example, a light-emitting diode or a xenon lamp. According to an embodiment, the camera devices 216a, 216b, and 225 may include one or a plurality of lenses, an image sensor, and/or an image signal processor. In an embodiment, at least one of the camera devices 216a, 216b, and 225 may include two or more lenses (wide-angle and telephoto lenses) and image sensors, and may be disposed together on either surface of the first housing 210 and/or the second housing 220.

According to various embodiments, the sensor modules 217a, 217b, and 226 may generate an electrical signal or data value corresponding to an internal operation state of the electronic device 200 or an external environment state thereof. According to an embodiment, the sensor modules 217a, 217b, and 226 may include a first sensor module 217a disposed on the first surface 211 of the first housing 210, a second sensor module 217b disposed on the second surface 212 of the first housing 210, and/or a third sensor module 226 disposed on the fourth surface 222 of the second housing 220. In an embodiment, the sensor modules 217a, 217b, and 226 may include at least one of a gesture sensor, a grip sensor, a color sensor, an infrared (IR) sensor, an illuminance sensor, an ultrasonic sensor, an iris recognition sensor, or a distance detection sensor (a TOF sensor or LiDAR scanner).

According to various embodiments, the electronic device 200 may include a first inertial sensor 283a disposed in the first housing 210, and a second inertial sensor 283b disposed in the second housing 220. According to an embodiment, the first inertial sensor 283a may be disposed in an inner space of the first housing 210 to generate an electrical signal or data value related to movement of the first housing 210. According to an embodiment, the second inertial sensor 283b may be disposed in the inner space of the second housing 220 to generate an electrical signal or data value related to movement of the second housing 220. For example, the first inertial sensor 283a and/or the second inertial sensor 283b may include a 6-axis sensor, a motion sensor, a gyro sensor, and/or an acceleration sensor.

According to various embodiments, the electronic device 200 may further include at least one or more various others sensors, for example, an air pressure sensor, a magnetic sensor, a biometric sensor, a temperature sensor, a humidity sensor, or a fingerprint recognition sensor. In an embodiment, the fingerprint recognition sensor may be disposed through at least one of the first lateral member 213 of the first housing 210 and/or the second lateral member 223 of the second housing 220.

According to various embodiments, the key input device 219 may be disposed to be exposed to the outside through the first lateral member 213 of the first housing 210. In an embodiment, the key input device 219 may be disposed to be exposed to the outside through the second lateral member 223 of the second housing 220. In an embodiment, the electronic device 200 may not include a part or all of the above-mentioned key input device 219, and a key input device 219, which is not included, may be implemented in another form, such as a soft key, on the at least one display 230 and 235. In another embodiment, the key input device 219 may be implemented using a pressure sensor included in the at least one display 230 and 235.

According to various embodiments, the connector port 229 may receive a connector (for example, a USB connector or an interface connector port module (IF module)) for transmitting or receiving power and/or data to or from an external electronic device. In an embodiment, the connector port 229 may perform a function for transmitting or receiving an audio signal to or from an external electronic device together or further include a separate connector port (e.g., an ear jack hole) for performing a function for transmitting or receiving an audio signal.

According to various embodiments, at least one camera device 216a and 225 among the camera devices 216a, 216b, and 225 and at least one sensor module 217a and 226 among the sensor modules 217a, 217b, and 226, and/or the indicator may be disposed to be exposed through the at least one display 230 and 235. For example, the at least one camera device 216a and 225, the at least one sensor module 217a and 226, and/or the indicator may be disposed under active areas (display areas) of the displays 230 and 235 in the inner spaces of the at least one housing 210 and 220, and disposed to be in contact with an external environment through an opening perforated up to a cover member (e.g., a window layer (not shown) of the first display 230 and/or the second rear cover 250). In another embodiment, some camera devices 216a and/or 225 or sensor modules 217a and/or 226 may be disposed to perform their functions without being visually exposed through the display 230 and/or 235. For example, an area of the display 230 and/or 235 (e.g., a display panel) facing the camera device 216a and/or 225 and/or the sensor module 217a and/or 226 may not require a perforated opening.

Referring to FIG. 2C, the electronic device 200 may operate to maintain the intermediate state through the hinge module (e.g., the hinge module 264 of FIG. 2D). According to an embodiment, the intermediate state may be an operation state corresponding to the first housing 210 and the second housing 220 being between an unfolded state and a folded state. The intermediate state may include an operation state in which a folding angle between the first housing 210 and the second housing 220 is included in a third reference range of, for example, from about 20 degrees to about 170 degrees. According to an embodiment, in the intermediate state, the electronic device 200 may operate such that the first housing 210 and the second housing 220 are maintained in the unfolded state at various angles through the hinge module (e.g., the hinge module 264 of FIG. 2D). For example, the unfolded state of the first housing 210 and the second housing 220 may include an operation state in which the folding angle between the first housing 210 and the second housing 220 is included in a first reference range of, for example, from about 170 degrees to about 180 degrees. For example, the folded state of the first housing 210 and the second housing 220 may include an operation state in which the folding angle between the first housing 210 and the second housing 220 is included in a second reference range of, for example, from about 0 degrees to about 20 degrees.

According to an embodiment, the electronic device 200 may use the first display 230 or the second display 235, based on the folding angle between the first housing 210 and the second housing 220. For example, when the folding angle between the first housing 210 and the second housing 220 is included in a designated first range (e.g., from about 20 degrees to about 75 degrees), the electronic device 200 may use the second display 235. For example, when the folding angle between the first housing 210 and the second housing 220 is included in a designated second range (e.g., from about 75 degrees to about 170 degrees), the electronic device 200 may use the first display 230. In an embodiment, the electronic device 200 may control the first display 230 to display different contents in a first area (e.g., a first area 231a of FIG. 2D) of the first display 230 corresponding to the first surface 211 and a second area (e.g., a second area 231b of FIG. 2D) of the first display 230 corresponding to the third surface 221. For example, the designated first range and/or the designated second range may be included in the third reference range for determining the intermediate state.

FIG. 2D is an exploded perspective view of the electronic device 200 according to various embodiments.

Referring to FIG. 2D, in an embodiment, the electronic device 200 may include the first display 230, the second display 235, a support member assembly 260, at least one printed circuit board 270, the first housing 210, the second housing 220, the first rear cover 240, and the second rear cover 250.

According to various embodiments, the first display 230 may include a display panel 231 (e.g., a flexible display panel) and one or more plates 232 or layers on which the display panel 231 (e.g., a flexible display panel) is seated. In an embodiment, the one or more plates 232 may include a conductive plate (e.g., a Cu sheet or an SUS sheet) disposed between the display panel 231 and the support member assembly 260. According to an embodiment, the one or more plates 232 may be configured to have substantially the same area as the first display 230, and may be configured such that an area thereof facing the folding area 230c of the first display 230 is bendable. According to an embodiment, the one or more plates 232 may include at least one sub-material layer (e.g., a graphite member) disposed on a rear surface of the display panel 231. In an embodiment, the one or more plates 232 may be configured to have a shape corresponding to the display panel 231.

According to various embodiments, the second display 235 may be disposed in the space between the second housing 220 and the second rear cover 250. According to an embodiment, the second display 235 may be disposed to be visible from the outside through substantially the entire area of the second rear cover 250, in the space between the second housing 220 and the second rear cover 250.

According to various embodiments, the support member assembly 260 may include a first support member 261 (e.g., a first support plate), a second support member 262 (e.g., a second support plate), the hinge module 264 disposed between the first support member 261 and the second support member 262, the hinge cover 265 which covers the hinge module 264 when viewed from the outside, and at least one wiring member 263 (e.g., a flexible printed circuit board (FPCB)) crossing the first support member 261 and the second support member 262. According to an embodiment, the support member assembly 260 may be disposed between the one or more plates 232 and the at least one printed circuit board 270. According to an embodiment, the first support member 261 may be disposed between the first area 231a of the first display 230 and a first printed circuit board 271. According to an embodiment, the second support member 262 may be disposed between the second area 231b of the first display 230 and a second printed circuit board 272. According to an embodiment, at least a part of the hinge module 264 and the at least one wiring member 263 may be disposed inside the support member assembly 260. The at least one wiring member 263 may be disposed in a direction (e.g., the x-axis direction) crossing the first support member 261 and the second support member 262. According to an embodiment, the at least one wiring member 263 may be disposed in a direction (e.g., the x-axis direction) perpendicular to a folding axis (e.g., the y-axis or the folding axis A of FIG. 2A) of the folding area 230c.

According to various embodiments, the at least one printed circuit board 270 may include the first printed circuit board 271 disposed to face the first support member 261, and the second printed circuit board 272 disposed to face the second support member 262. According to an embodiment, the first printed circuit board 271 and the second printed circuit board 272 may be disposed in an inner space formed by the support member assembly 260, the first housing 210, the second housing 220, the first rear cover 240, and/or the second rear cover 250. According to an embodiment, the first printed circuit board 271 and the second printed circuit board 272 may include a plurality of electronic components arranged to implement various functions of the electronic device 200.

According to various embodiments, the electronic device may include, in the first space of the first housing 210, the first printed circuit board 271 disposed in a space formed through the first support member 261, a first battery 291 disposed at a position facing a first swelling hole 2611 of the first support member 261, at least one camera device 282 (e.g., the first camera device 216a and/or the second camera device 216b of FIG. 2A), or at least one sensor module 281 (e.g., the first sensor module 217a and/or the second sensor module 217b of FIG. 2A). According to an embodiment, the second space of the second housing 220 may include the second printed circuit board 272 disposed in a second space formed through the second support member 262, and a second battery 292 disposed at a position facing a second swelling hole 2621 of the second support member 262. According to an embodiment, the first housing 210 and the first support member 261 may be integrally configured. According to an embodiment, the second housing 220 and the second support member 262 may also be integrally configured.

According to various embodiments, the first housing 210 may include a first rotation support surface 214, and the second housing 220 may include a second rotation support surface 224 corresponding to the first rotation support surface 214. According to an embodiment example, the first rotation support surface 214 and the second rotation support surface 224 may include a curved surface corresponding to (naturally connected to) a curved surface included in the hinge cover 265. According to an embodiment, when the electronic device 200 is in the unfolded state, the first rotation support surface 214 and the second rotation support surface 224 may cover the hinge cover 265 so that the hinge cover 265 is not exposed to the rear surface of the electronic device 200 or is minimally exposed. In an embodiment, when the electronic device 200 is in the folded state, the first rotation support surface 214 and the second rotation support surface 224 may rotate along the curved surface included in the hinge cover 265 to maximally expose the hinge cover 265 to the rear surface of the electronic device 200.

Figure 3:
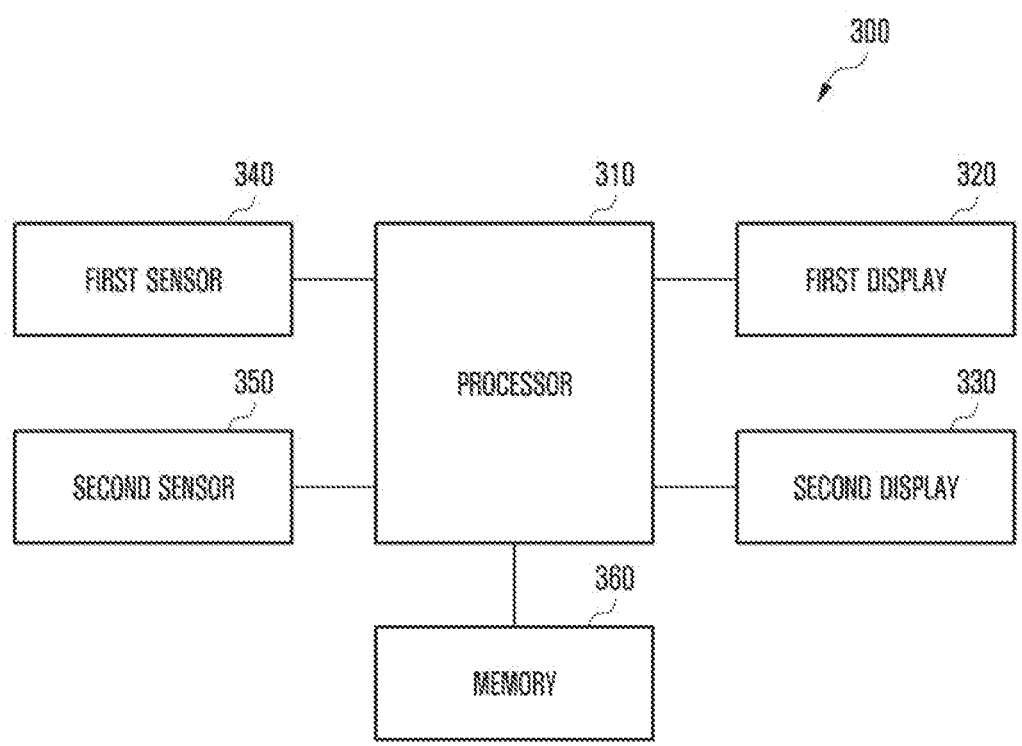
FIG. 3 is a block diagram of an electronic device for controlling screen rotation according to various embodiments.

FIG. 3 is a block diagram of an electronic device for controlling screen rotation according to various embodiments. According to an embodiment, an electronic device 300 of FIG. 3 may be at least partially similar to the electronic device 101 of FIG. 1 or the electronic device 200 of FIG. 2A, or may further include other embodiments of the electronic device.

Referring to FIG. 3, according to various embodiments, the electronic device 300 may include a processor 310, a first display 320, a second display 330, a first sensor 340, a second sensor 350, and/or a memory 360. According to an embodiment, the processor 310 may be substantially the same as the processor 120 of FIG. 1 or included in the processor 120. The first display 320 and/or the second display 330 may be substantially the same as the display module 160 of FIG. 1 or included in the display module 160. The first sensor 340 and/or the second sensor 350 may be substantially the same as the sensor module 176 of FIG. 1 or included in the sensor module 176. The memory 360 may be substantially the same as the memory 130 of FIG. 1 or included in the memory 130.

According to an embodiment, the first display 320 may be substantially the same as the first display 230 of FIG. 2A or included in the first display 230. The second display 330 may be substantially the same as the second display 235 of FIG. 2A or included in the second display 235. The first sensor 340 may be substantially the same as the first inertial sensor 283a of FIG. 2A or included in the first inertial sensor 283a. The second sensor 350 may be substantially the same as the second inertial sensor 283b of FIG. 2A or included in the second inertial sensor 283b.

According to various embodiments, the first display 320 may be disposed from at least a part of a first surface (e.g., the first surface 211 of FIG. 2A) of a first housing (e.g., the first housing 210 of FIG. 2A) of the electronic device 300 to at least a part of a third surface (e.g., the third surface 221 of FIG. 2A) of a second housing (e.g., the second housing 220 of FIG. 2A). According to an embodiment, the first display 320 may include a flexible display in which at least a partial area thereof can be changed to a flat or curved surface based on a folding angle between the first housing (e.g., the first housing 210 of FIG. 2A) and the second housing (e.g., the second housing 220 of FIG. 2A).

According to various embodiments, the second display 330 may be disposed to be visible from the outside through at least a part of a fourth surface (e.g., the fourth surface 222 of FIG. 2A) in an inner space of the second housing (e.g., the second housing 220 of FIG. 2A) of the electronic device 300.

According to various embodiments, the first display 320 and/or the second display 330 may display information processed by the electronic device 300. According to an embodiment, the first display 320 and/or the second display 330 may display a content related to an application program executed by the processor 310. According to an embodiment, when the electronic device 300 operates in a sleep mode, the first display 320 and/or the second display 330 may display a content related to a low power display mode (e.g., may be an always on display (AOD)). For example, the sleep mode of the electronic device 300 may include a state in which driving of the processor 310 (e.g., an application processor) is restricted.

According to various embodiments, the first sensor 340 may be disposed in at least a part of an inner space of the first housing (e.g., the first housing 210 of FIG. 2A) of the electronic device 300. According to an embodiment, the first sensor 340 may collect information such as, for example, posture, angular velocity, and/or acceleration, information related to movement of the first housing (e.g., the first housing 210 of FIG. 2A) to provide the collected information to the processor 310. For example, the first sensor 340 may include an inertial sensor, a motion sensor, a 6-axis sensor, a first gyro sensor, and/or a first acceleration sensor.

According to various embodiments, the second sensor 350 may be disposed in at least a part of the inner space of the second housing (e.g., the second housing 220 of FIG. 2A) of the electronic device 300. According to an embodiment, the second sensor 350 may collect information such as, for example, posture, angular velocity, and/or acceleration information related to movement of the second housing (e.g., the second housing 220 of FIG. 2A) to provide the collected information to the processor 310. For example, the second sensor 350 may include an inertial sensor, a motion sensor, a 6-axis sensor, a second gyro sensor, and/or a second acceleration sensor.

According to various embodiments, the processor 310 may control the first display 320, the second display 330, and the first sensor 340 and/or the second sensor 350 which are operatively connected. For example, the processor 310 may include an application processor or a sensor hub processor.

According to various embodiments, the processor 310 may detect a folding angle of the electronic device 300. According to an embodiment, when the first display 320 and/or the second display 330 is in an active state, the processor 310 may detect the folding angle between the first housing (e.g., the first housing 210 of FIG. 2A) and the second housing (e.g., the second housing 220 of FIG. 2A), based on sensor data collected through the first sensor 340 and the second sensor 350. For example, when the first display 320 and/or the second display 330 is in the active state, the processor 310 may detect the folding angle between the first housing (e.g., the first housing 210 of FIG. 2A) and the second housing (e.g., the second housing 220 of FIG. 2A) by using the first sensor 340, the second sensor 350, and a magnetic detection sensor such as, for example, a Hall IC. For example, the magnetic detection sensor may be disposed in the first housing (or the second housing) to detect a magnetic force generated from a magnetic material disposed in the second housing (or the first housing). For example, the active state of the first display 320 and/or the second display 330 may include a state in which all pixels of a display (e.g., the first display 320 and/or the second display 330) are activated. For example, the processor 310 (e.g., the application processor) may be activated when the first display 320 and/or the second display 330 is in the active state. In this case, the first sensor 340 and/or the second sensor 350 may be controlled by the application processor and/or the sensor hub processor.

According to an embodiment, when the first display 320 and the second display 330 are in an inactive state, the processor 310 may detect a folding angle between the first housing (e.g., the first housing 210 of FIG. 2A) and the second housing (e.g., the second housing 220 of FIG. 2A), based on sensor data collected through a part (e.g., the first acceleration sensor) of the first sensor 340 and/or a part (e.g., the second acceleration sensor) of the second sensor 350. For example, the inactive state of the first display 320 and/or the second display 330 may include a state in which at least one pixel of the display (e.g., the first display 320 and/or the second display 330) is activated or a state in which all pixels of the display are inactivated. For example, when the first display 320 and/or the second display 330 is in the inactive state, the application processor of the processor 310 may be inactivated, and the sensor hub processor may control the first sensor 340 and/or the second sensor 350.

According to various embodiments, the processor 310 may select the first display 320 and/or the second display 330 as a display for displaying a content, based on the folding angle of the electronic device 300. For example, the content may include a content related to an application program executed by the processor 310 or a content related to a low power display mode (e.g., an always on display AOD). According to an embodiment, when the processor 310 determines that the electronic device 300 is in an unfolded state (e.g., the state of FIG. 2A), based on the folding angle of the electronic device 300, the processor may select the first display 320 to display a content. For example, the unfolded state of the electronic device 300 may include a state in which the folding angle of the electronic device 300 is included in the first reference range (e.g., from about 170 degrees to about 180 degrees). According to an embodiment, when the processor 310 determines that the electronic device 300 is in a folded state (e.g., the state of FIG. 2B), based on the folding angle of the electronic device 300, the processor 310 may select the second display 330 to display a content. For example, the folded state of the electronic device 300 may include a state in which the folding angle of the electronic device 300 is included in the second reference range (e.g., from about 0 degrees to about 20 degrees).

According to an embodiment, when the folding angle of the electronic device 300 is included in the designated first range (e.g., from about 20 degrees to about 75 degrees), the processor 310 may select the second display 330 to display a content. For example, when the folding angle of the electronic device 300 is included in the designated first range (e.g., from about 20 degrees to about 75 degrees), the electronic device 300 may operate in a first sub-mode or a second sub-mode, based on an area which is placed on (or in contact with) a horizontal plane. For example, the horizontal plane may refer to a plane substantially perpendicular to the direction of gravity. Accordingly, the processor 310 may select the second display 330 to display a content in the first sub-mode and the second-sub mode. For example, the first sub-mode may include a state in which a second surface (e.g., the second surface 212 of FIG. 2A) of the first housing (e.g., the first housing 210 of FIG. 2A) is placed on (or in contact with) the horizontal plane. For example, the second sub-mode may include a state in which a lateral surface (e.g., the first lateral member 213 of FIG. 2A) of the first housing (e.g., the first housing 210 of FIG. 2A) and a lateral surface (e.g., the second lateral member 223 of FIG. 2A) of the second housing (e.g., the second housing 220 of FIG. 2A) are placed on (or in contact with) the horizontal plane. For example, when the folding angle of the electronic device is included in a designated third range of the vertical axis (e.g., the Z-axis in FIG. 2A), the transverse axis (e.g., the X-axis in FIG. 2A), and the longitudinal axis (e.g., the Y-axis in FIG. 2A) of the first sensor 340, the processor 310 may determine that the second surface of the first housing is in a state of being placed on (or in contact with) the horizontal plane. For example, the designated third range may include a range from about −25 degrees to about 25 degrees about the transverse axis, a range from about −12 degrees to about 12 degrees about the longitudinal axis, and a range from about 65 degrees to about 90 degrees about the vertical axis.

According to an embodiment, when the folding angle of the electronic device 300 is included in the designated second range (e.g., from about 75 degrees to about 170 degrees), the processor 310 may select the first display 320 to display a content. For example, when the folding angle of the electronic device 300 is included in the designated first range or the designated second range, the processor 310 may determine that the electronic device 300 is in an intermediate state (e.g., the state of FIG. 2C).

According to various embodiments, the processor 310 may select the first sensor 340 and/or the second sensor 350 as a sensor to be used to detect rotation of the electronic device 300, based on the folding angle of the electronic device 300. According to an embodiment, when the processor 310 determines that the electronic device 300 is in the unfolded state (e.g., the state of FIG. 2A), based on the folding angle of the electronic device 300, the processor may select the first sensor 340 and/or the second sensor 350 as the sensor to be used to detect rotation of the electronic device 300. For example, the processor 310 may indicate that all axis directions of the first sensor 340 and the second sensor 350 are the same while the electronic device 300 is in the unfolded state. Accordingly, while the electronic device 300 is in the unfolded state, the processor 310 may select the first sensor 340 (e.g., the first acceleration sensor) or the second sensor 350 (e.g., the second acceleration sensor) as a sensor for detecting rotation of the electronic device 300. For example, when the first display 320 is in the inactive state while the electronic device 300 is in the unfolded state, the processor 310 may select the first sensor 340 (e.g., the first acceleration sensor) or the second sensor 350 (e.g., the second acceleration sensor) as a sensor for detecting rotation of the electronic device 300, in order to reduce power consumption.

According to an embodiment, when the processor 310 determines that the electronic device 300 is in the folded state (e.g., the state of FIG. 2B), based on the folding angle of the electronic device 300, the processor may select the first sensor 340 as the sensor to be used to detect rotation of the electronic device 300. For example, since the second display 330 selected to display a content while the electronic device 300 is in the folded state corresponds to the direction (e.g., the Z-axis) of the vertical axis of the first sensor 340, the processor 310 may select the first sensor 340 as the sensor to be used to detect rotation of the electronic device 300.

According to an embodiment, when the folding angle of the electronic device 300 is included in the designated first range (e.g., from about 20 degrees to about 75 degrees), the processor 310 may select the second sensor 350 as the sensor to be used to detect rotation of the electronic device 300.

According to an embodiment, when the folding angle of the electronic device 300 is included in the designated second range (e.g., from about 75 degrees to about 170 degrees), the processor 310 may select the first sensor 340 and/or the second sensor 350 as the sensor to be used to detect rotation of the electronic device 300. For example, when the second surface (e.g., the second surface 212 of FIG. 2A) of the first housing (e.g., the first housing 210 of FIG. 2A) is placed on (or in contact with) the horizontal plane in a state where the folding angle of the electronic device 300 is included in the designated second range (e.g., from about 75 degrees to about 170 degrees), the processor 310 may select the second sensor 350 as the sensor to be used to detect rotation of the electronic device 300. For example, when the fourth surface (e.g., the fourth surface 222 of FIG. 2A) of the second housing (e.g., the second housing 220 of FIG. 2A) is placed on (or in contact with) the horizontal plane in a state where the folding angle of the electronic device 300 is included in the designated second range (e.g., from about 75 degrees to about 170 degrees), the processor 310 may select the first sensor 340 as the sensor to be used to detect rotation of the electronic device 300. For example, when the second surface (e.g., the second surface 212 of FIG. 2A) of the first housing (e.g., the first housing 210 of FIG. 2A) and the fourth surface (e.g., the fourth surface 222 of FIG. 2A) of the second housing (e.g., the second housing 220 of FIG. 2A) are not placed on (or in contact with) the horizontal plane in a state where the folding angle of the electronic device 300 is included in the designated second range (e.g., from about 75 degrees to about 170 degrees), the processor 310 may select the first sensor 340 and the second sensor 350 as the sensor to be used to detect rotation of the electronic device 300. For example, when the folding angle of the electronic device is included in a designated third range of the vertical axis (e.g., the Z-axis in FIG. 2A), the transverse axis (e.g., the X-axis in FIG. 2A), and the longitudinal axis (e.g., the Y-axis in FIG. 2A) of the second sensor 350, the processor 310 may determine that the fourth surface of the second housing is in a state of being placed on the horizontal plane.

According to various embodiments, the processor 310 may configure a display direction of a content, based on the first sensor 340 and/or the second sensor 350 selected based on the folding angle of the electronic device 300. According to an embodiment, the processor 310 may detect an orientation angle of the electronic device 300, based on the first sensor 340 (e.g., the first acceleration sensor) and/or the second sensor 350 (e.g., the second acceleration sensor). The processor 310 may configure the display direction of the content, based on the orientation angle of the electronic device 300. For example, the orientation angle of the electronic device 300 may refer to an angle between the transverse axis (e.g., the X-axis in FIG. 2A) and the longitudinal axis (e.g., the Y-axis in FIG. 2A), the angle corresponding to one surface of the electronic device 300 viewed by a user. The processor 310 may configure the display direction of the content, based on the orientation angle corresponding to the one surface of the electronic device 300 viewed by the user. The user may refer to, for example, a user who owns and/or operates the electronic device 300. The display direction of the content may refer to, for example, a direction in which a user's gaze is directed.

According to various embodiments, the processor 310 may generate information related to the content to be displayed on the first display 320 or the second display 330 selected to display the content, based on the display direction of the content. According to an embodiment, the processor 310 may generate the information related to the content, based on the size of a display area (e.g., screen) for displaying the content, a start position of the content, and/or a display direction of the content. For example, when the first display 320 is selected, the processor 310 may draw the information related to the content in a buffer of the first display 320. In this case, the first display 320 may output the information related to the content drawn in the buffer to the display panel. For example, when the second display 330 is selected, the processor 310 may draw the information related to the content in a buffer of the second display 330. In this case, the second display 330 may output the information related to the content drawn in the buffer to the display panel.

According to various embodiments, the memory 360 may store various data used by at least one component (e.g., the processor 310, the first display 320, the second display 330, the first sensor 340, or the second sensor 350) of the electronic device 300. For example, the data may include information related to a reference range and/or a designated range for classifying an operation state of the electronic device 300. As another example, the data may include sensor data collected by the first sensor 340 and/or the second sensor 350.

According to various embodiments of the disclosure, an electronic device (e.g., the electronic device 101 of FIG. 1, the electronic device 200 of FIG. 2A, or the electronic device 300 of FIG. 3) may include a hinge module (e.g., the hinge module of FIG. 2D), a first housing (e.g., the first housing 210 of FIG. 2A) connected to the hinge module and including a first surface (e.g., the first surface 211 of FIG. 2A), a second surface (e.g., the second surface 212 of FIG. 2A) facing a direction opposite to the first surface, and a first lateral surface (e.g., the first lateral member 213 of FIG. 2A) surrounding a first space between the first surface and the second surface, a second housing (e.g., the second housing 220 of FIG. 2A) connected to the hinge module so as to be foldable with respect to the first housing and, in an unfolded state, including a third surface (e.g., the third surface 221 of FIG. 2A) facing the same direction as the first surface, a fourth surface (e.g., the fourth surface 222 of FIG. 2A) facing a direction opposite to the third surface, and a second lateral surface (e.g., the second lateral surface 223 of FIG. 2A) surrounding a second space between the third surface and the fourth surface, a first display (e.g., the display module 160 of FIG. 1, the first display 230 of FIG. 2A, or the first display 320 of FIG. 3) disposed from at least a part of the first surface to at least a part of the third surface, a second display (e.g., the display module 160 of FIG. 1, the second display 235 of FIG. 2A, or the second display 330 of FIG. 3) disposed in the second space so as to be visible from the outside through at least a part of the fourth surface, a first sensor (e.g., the sensor module 176 of FIG. 1, the first inertial sensor 283*a* of FIG. 2A, or the first sensor 340 of FIG. 3) disposed in at least a part of the first space and configured to collect sensor data related to movement of the first housing, a second sensor (e.g., the sensor module 176 of FIG. 1, the second inertial sensor 283*b* of FIG. 2A, or the second sensor 350 of FIG. 3) disposed in at least a part of the second space and configured to collect sensor data related to movement of the second housing, and a processor (e.g., the processor 120 of FIG. 1 or the processor 310 of FIG. 3) operatively connected with the first display, the second display, the first sensor, and the second sensor, wherein the processor is configured to identify a folding angle between the first housing and the second housing through the first sensor and the second sensor, select the second display when the folding angle between the first housing and the second housing satisfies a designated first range, determine a display direction of a content, based on sensor data collected through the second sensor, and control the second display to display the content, based on the display direction of the content.

According to various embodiments, the electronic device may further include a magnetic detection sensor disposed in the first space or the second space, wherein the processor is configured to, when the first display and/or the second display is in an active state, identify the folding angle between the first housing and the second housing by using the first sensor, the second sensor, and the magnetic detection sensor, and when the first display and the second display are in an inactive state, identify the folding angle between the first housing and the second housing through a part of the first sensor and a part of the second sensor.

According to various embodiments, the first sensor and/or the second sensor may include an acceleration sensor and a gyro sensor, and the part of the first sensor and/or the second sensor may include the acceleration sensor.

According to various embodiments, the processor may be configured to select the second display when the first housing and the second housing are determined as being in a folded state, based on the folding angle between the first housing and the second housing, determine the display direction of the content, based on sensor data collected through the first sensor, and control the second display to display the content, based on the display direction of the content.

According to various embodiments, the processor may be configured to select the first display when the first housing and the second housing are determined as being in the unfolded state, based on the folding angle between the first housing and the second housing, determine the display direction of the content, based on sensor data collected through the first sensor and/or the second sensor, and control the first display to display the content, based on the display direction of the content.

According to various embodiments, the processor may be configured to, when the first display is in an active state in a state where the first housing and the second housing are in the unfolded state, determine the display direction of the content, based on the sensor data collected through the first sensor and the second sensor, and when the first display is in an inactive state in a state where the first housing and the second housing are in the unfolded state, determine the display direction of the content, based on the sensor data collected through the first sensor or the second sensor.

According to various embodiments, the processor may be configured to select the first display when the folding angle between the first housing and the second housing satisfies a designated second range different from the designated first range, determine the display direction of the content, based on sensor data collected through the first sensor and/or the second sensor, and control the first display to display the content, based on the display direction of the content.

According to various embodiments, the processor may be configured to, when the sensor data collected through the first sensor satisfies a designated first condition, determine the display direction of the content, based on the sensor data collected through the second sensor, and when the sensor data collected through the second sensor satisfies the designated first condition, determine the display direction of the content, based on the sensor data collected through the first sensor.

According to various embodiments, the processor may be configured to, when the sensor data collected through the first sensor and the second sensor does not satisfy the designated first condition, determine the display direction of the content, based on the sensor data collected through the first sensor and the second sensor.

According to various embodiments, the content may include a content related to an application program or a content related to a low power display mode.

Figure 4:
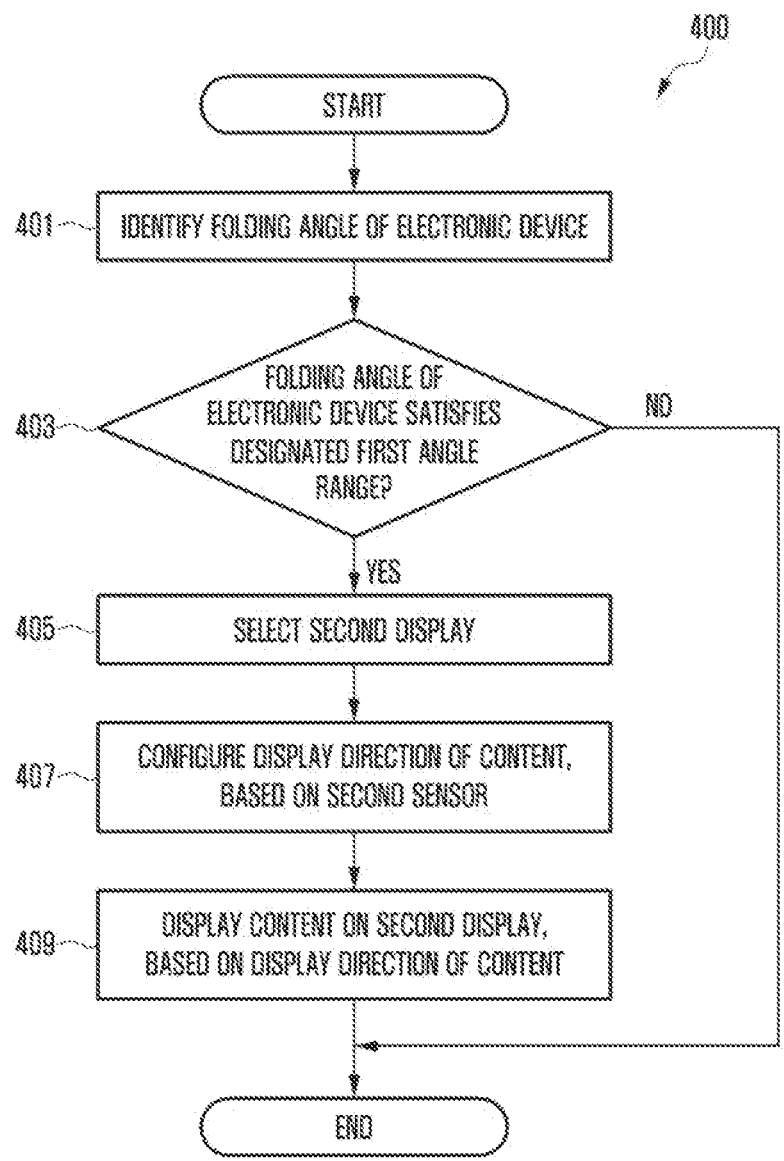
FIG. 4 is a flowchart of configuring a display direction of a second display in an electronic device in an intermediate state according to various embodiments.
Figure 5A:
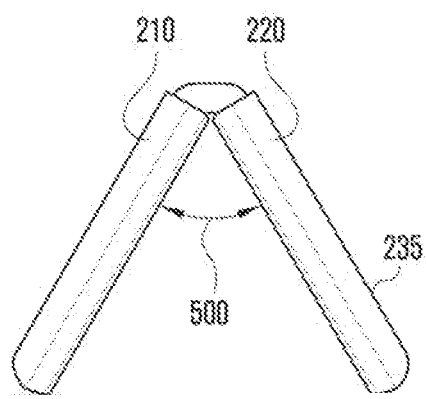
FIGS. 5A, 5B, and 5C illustrate an example of switching a display direction of a second display in an electronic device in an intermediate state according to various embodiments.
Figure 5B:
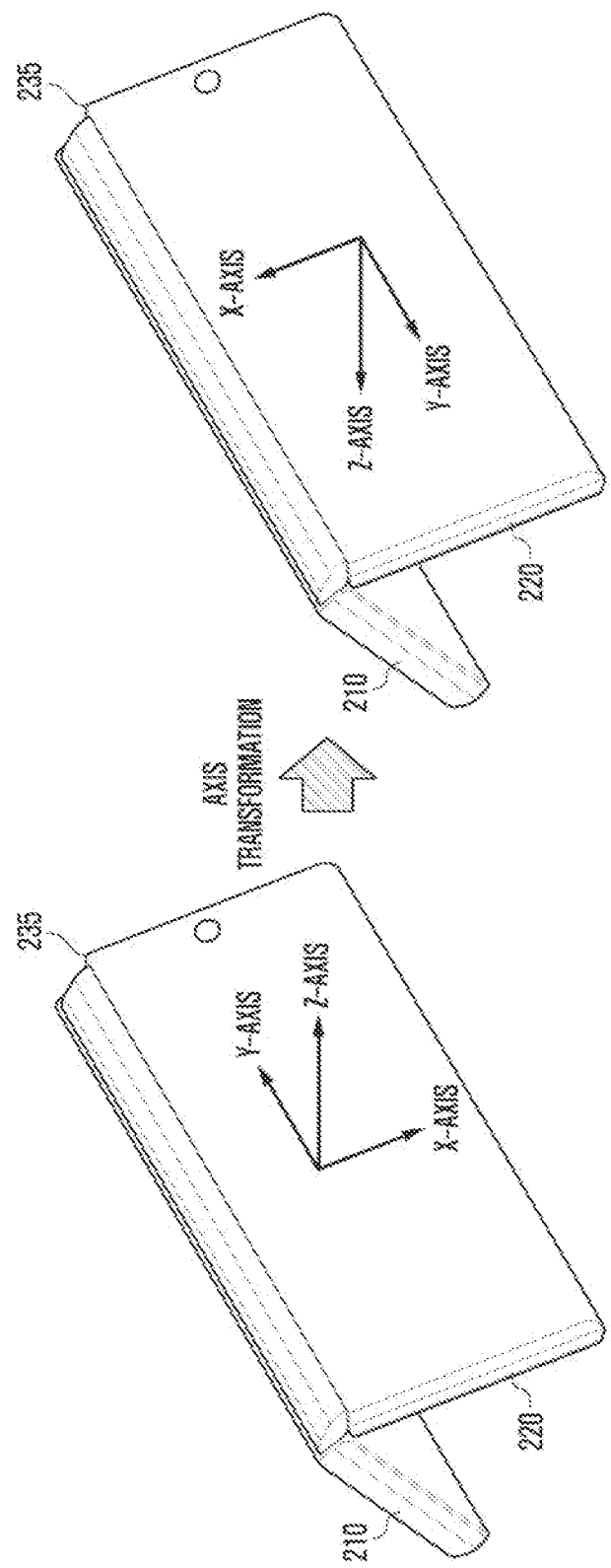
Figure 5C:
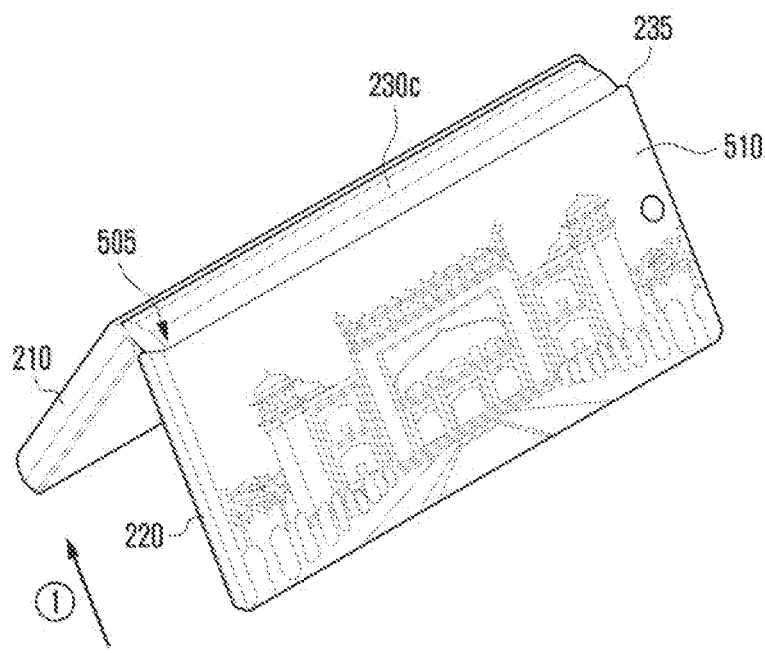
Figure 6A:
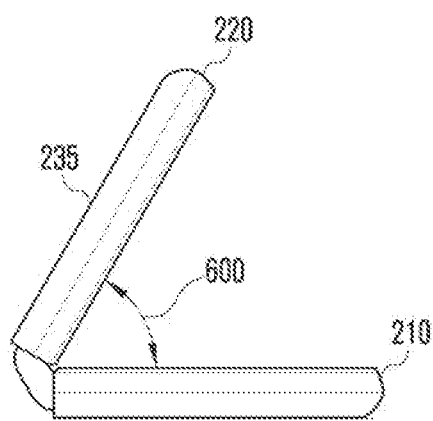
FIGS. 6A and 6B illustrate another example of switching a display direction of a second display in an electronic device in an intermediate state according to various embodiments.
Figure 6B:
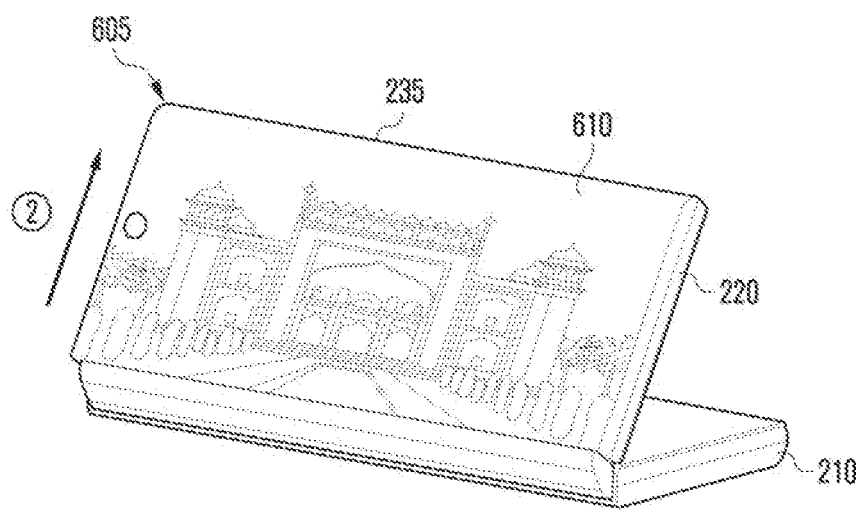

FIG. 4 is a flowchart 400 related to configuring a display direction of a second display in an electronic device in an intermediate state according to various embodiments. In the following embodiments, operations may be performed sequentially, but are not necessarily performed sequentially. For example, the order of the operations may be changed, and multiple operations such as at least two operations may be performed in parallel. For example, an electronic device of FIG. 4 may be the electronic device 101 of FIG. 1, the electronic device 200 of FIG. 2A, the electronic device 300 of FIG. 3 or another embodiment of an electronic device. At least some configurations of FIG. 4 will be described with reference to FIGS. 5A, 5B, 5C, 6A, and 6B. FIGS. 5A, 5B, and 5C illustrate an example of switching a display direction of a second display in an electronic device in an intermediate state according to various embodiments. FIGS. 6A and 6B illustrate another example of switching a display direction of a second display in an electronic device in an intermediate state according to various embodiments.

Referring to FIG. 4, according to various embodiments, in operation 401, an electronic device (e.g., the processor 120 of FIG. 1 or the processor 310 of FIG. 3) may identify a folding angle of the electronic device. According to an embodiment, the processor 310 may identify the folding angle of the electronic device, based on the first sensor 340 disposed in a first housing (e.g., the first housing 210 of FIG. 2A), the second sensor 350 disposed in a second housing (e.g., the second housing 220 of FIG. 2A), and/or a magnetic detection sensor (e.g., a Hall IC). For example, when the first display 320 and/or the second display 330 is in an active state, the processor 310 may detect the folding angle of the electronic device by using the first sensor 340, the second sensor 350, and the magnetic detection sensor. For example, when the first display 320 and the second display 330 are in an inactive state, the processor 310 may detect the folding angle of the electronic device by using a part (e.g., the first acceleration sensor) of the first sensor 340 and a part (e.g., the second acceleration sensor) of the second sensor 350. For example, the folding angle of the electronic device may include an angle between the first housing (e.g., the first housing 210 of FIG. 2A) and the second housing (e.g., the second housing 220 of FIG. 2A).

According to various embodiments, in operation 403, the electronic device (e.g., the processor 120 or 310) may identify whether the folding angle of the electronic device satisfies a designated first range (e.g., from about 20 degrees to about 75 degrees). According to an embodiment, as shown in FIG. 5A, when a folding angle 500 between the first housing 210 and the second housing 220 is included in the designated first range, the processor 310 may determine that the folding angle satisfies the designated first range. According to an embodiment, as shown in FIG. 6A, when a folding angle 600 between the first housing 210 and the second housing 220 is included in the designated first range, the processor 310 may determine that the folding angle satisfies the designated first range.

According to various embodiments, when the folding angle of the electronic device satisfies the designated first range (e.g., "Yes" in operation 403), in operation 405, the electronic device (e.g., the processor 120 or 310) may select a second display (e.g., the second display 235 of FIG. 2A or the second display 330 of FIG. 3) as a display for displaying a content. According to an embodiment, when the second display 330 is selected as the display for displaying a content, power may be supplied to the second display. In this case, power supply to the first display 320 may be cut off. For example, the content may include a content related to an application program executed by the processor 310 or a content related to a low power display mode (e.g., an always on display AOD).

According to various embodiments, in operation 407, the electronic device (e.g., the processor 120 or 310) may configure a display direction of the content, based on a second sensor (e.g., the second inertial sensor 283b of FIG. 2A or the second sensor 350 of FIG. 3).

According to an embodiment, as shown in FIG. 5A, when the folding angle 500 between the first housing 210 and the second housing 220 is included in the designated first range and the electronic device operates in a second sub-mode, the processor 310 may detect an orientation angle of the electronic device 300, based on sensor data collected through the second sensor 350 (e.g., the second acceleration sensor). For example, as shown in FIG. 5B, since the vertical axis (e.g., the Z-axis in FIG. 2A) of the second sensor 350 is disposed to face the first display 320, the processor 310 may detect the orientation angle of the electronic device 300 by inverting (e.g., rotating 180 degrees) the vertical axis (e.g., the Z-axis in FIG. 2A) and the transverse axis (e.g., the X-axis in FIG. 2A) of the second sensor 350 with reference to the longitudinal axis thereof (e.g., the Y-axis in FIG. 2A). For example, the processor 310 may configure a direction (e.g., the transformed direction of the X-axis in FIG. 5B) facing an upper end of a virtual plane obtained by extending the transverse axis (e.g., the X-axis in FIG. 2A) and the longitudinal axis (e.g., the Y-axis in FIG. 2A) forming the orientation angle of the electronic device 300 as the display direction of the content, based on the orientation angle of the electronic device 300. For example, the processor 310 may configure a first direction (e.g., direction ① in FIG. 5C) oriented from the second housing 220 toward the folding area 230c (e.g., the hinge module 264 of FIG. 2D) as the display direction of the content, based on the orientation angle of the electronic device 300. For example, the second sub-mode may include a state in which a lateral surface (e.g., the first lateral member 213 of FIG. 2A) of the first housing 210 and a lateral surface (e.g., the second lateral member 223 of FIG. 2A) of the second housing 220 are placed on (or in contact with) a horizontal plane as shown in FIG. 5A.

According to an embodiment, as shown in FIG. 6A, when the folding angle 600 between the first housing 210 and the second housing 220 is included in the designated first range and the electronic device operates in a first sub-mode, the processor 310 may detect the orientation angle of the electronic device 300, based on sensor data collected through the second sensor 350. For example, the processor 310 may detect the orientation angle of the electronic device 300, based on a change in the longitudinal axis (e.g., the Y-axis in FIG. 2A) and the transverse axis (e.g., the X-axis in FIG. 2A) of the second sensor 350 (e.g., the second acceleration sensor). For example, the processor 310 may configure a second direction (e.g., direction ② in FIG. 6B) oriented from the folding area 230c (e.g., the hinge module 264 of FIG. 2D) toward the second housing 220 as the display direction of the content, based on the orientation angle of the electronic device 300. For example, the first sub-mode may include a state in which a second surface (e.g., the second surface 212 of FIG. 2A) of the first housing 210 is placed on (or in contact with) the horizontal plane as shown in FIG. 6A.

According to various embodiments, in operation 409, the electronic device (e.g., the processor 120 or 310) may display the content on the second display (e.g., the second display 235 of FIG. 2A or the second display 330 of FIG. 3), based on the display direction of the content. According to an embodiment, the processor 310 may generate information related to the content to be displayed on the second display 330, based on the display direction of the content. For example, as shown in FIG. 5C, the processor 310 may draw the information related to the content in the buffer of the second display 330 such that the content starts from a first point 505, based on the first direction (e.g., direction ① in FIG. 5C) which is the display direction of the content. For example, as shown in FIG. 6B, the processor 310 may draw the information related to the content in the buffer of the second display 330 such that the content starts from a second point 605, based on the second direction (e.g., direction ② in FIG. 6B) which is the display direction of the content. For example, the information related to the content may be generated based on the size of a display area (e.g., screen) for displaying the content, a start position of the content, and/or a display direction of the content. According to an embodiment, as shown in FIG. 5C, in the case of operating in the second sub-mode, the second display 330 may display a content 510, based on the first direction (e.g., direction ①) facing the folding area 230c (e.g., the hinge module 264 of FIG. 2D). For example, the second display 330 may output, to the display panel, the information related to the content drawn in the buffer of the second display 330 by the processor 310 based on the first direction. For example, the second display 330 may output the information related to the content to the display panel from the first point 505.

According to an embodiment, as shown in FIG. 6B, in the case of operating in the first sub-mode, the second display 330 may display a content 610, based on the second direction (e.g., direction ②) oriented from the folding area 230c (e.g., the hinge module 264 of FIG. 2D) toward the second housing 220. For example, the second display 330 may output, to the display panel, the information related to the content drawn in the buffer of the second display 330 by the processor 310 based on the second direction. For example, the second display 330 may output the information related to the content to the display panel from the second point 605.

According to various embodiments, when the second display 330 is in the active state in a state where the folding angle between the first housing 210 and the second housing 220 is included in the designated first range, the electronic device 300 may display, on the second display 330, a content (e.g., a game, a video, a website, and/or a still image) related to an application program executed in the electronic device 300. In this case, power supply to the first display 320 may be cut off.

According to various embodiments, when the second display 330 is in the inactive state and the electronic device 300 is in a state where the folding angle between the first housing 210 and the second housing 220 is included in the designated first range, the electronic device 300 may display, on the second display 330, a content (e.g., time, weather, date, calendar, and/or notification information) related to a low power display mode (e.g., always on display AOD). In this case, a power supply to the first display 320 may be cut off.

According to various embodiments, when the electronic device 300 changes from the second sub-mode as shown in FIG. 5A to the first sub-mode as shown in FIG. 6A, the electronic device 300 may switch the display direction of the content from a state in which the content 510 is displayed to correspond to the first direction (e.g., direction ①) as shown in FIG. 5C to a state in which the content 610 is displayed to correspond to the second direction (e.g., direction ②) as shown in FIG. 6B. According to an embodiment, when changing from the first sub-mode as shown in FIG. 6A to the second sub-mode as shown in FIG. 5A, the electronic device 300 may switch the display direction of the content from a state in which the content 610 is displayed to correspond to the second direction (e.g., direction ②) as shown in FIG. 6B to a state in which the content 510 is displayed to correspond to the first direction (e.g., direction ①) as shown in FIG. 5C. According to an embodiment, the processor 310 may generate the information related to the content to be displayed on the second display 330, based on the display direction switch of the content. The processor 310 may draw the information related to the content in the buffer of the second display 330. For example, the second display 330 may output the information related to the content drawn in the buffer to the display panel.

Figure 7:
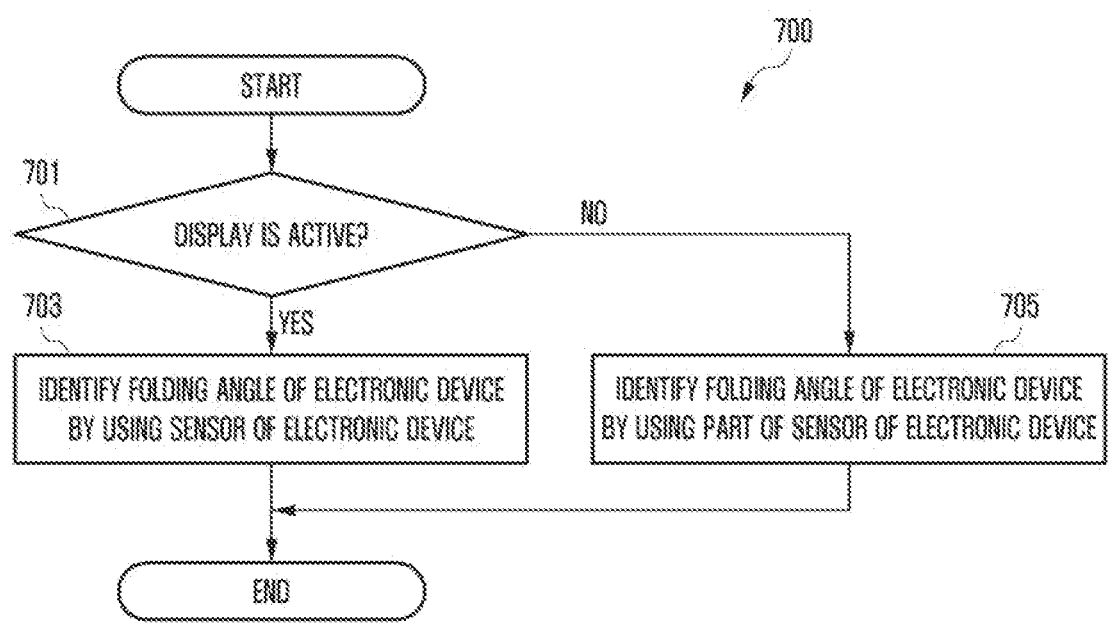
FIG. 7 is a flowchart of detecting a folding angle in an electronic device according to various embodiments.

FIG. 7 is a flowchart 700 related to detecting a folding angle in an electronic device according to various embodiments. According to an embodiment, the operations of FIG. 7 may be detailed operations of operation 401 of FIG. 4. In the following embodiments, the operations may be performed sequentially, but are not necessarily performed sequentially. For example, the order of the operations may be changed, and multiple operations such as at least two operations may be performed in parallel. An electronic device of FIG. 7 may be, for example, the electronic device 101 of FIG. 1, the electronic device 200 of FIG. 2A, the electronic device 300 of FIG. 3, or another embodiment of an electronic device.

Referring to FIG. 7, according to various embodiments, in operation 701, an electronic device (e.g., the processor 120 of FIG. 1 or the processor 310 of FIG. 3) may identify whether a first display (e.g., the first display 230 or 320) and/or a second display (e.g., the second display 235 or 330) is in an active state. According to an embodiment, the processor 310 may control the first display 320 or the second display 330 to be switched into the active state, based on an active event. For example, the active event may be generated based on an input of a power button, fingerprint image acquisition of a fingerprint sensor, a touch input associated with the active event, and/or movement of the electronic device associated with the active event. For example, the active state of the first display 320 and/or the second display 330 may include a state in which power is applied to a display (e.g., the first display 320 and/or the second display 330) and all pixels of the display (e.g., the first display 320 and/or the second display 330) are activated. For example, when the first display 320 and/or the second display 330 is in the active state, the processor 310 (e.g., the application processor) may be activated so as to control the display (e.g., the first display 320 and/or the second display 330).

According to various embodiments, when the first display (e.g., the first display 230 or 320) and/or the second display (e.g., the second display 235 or 330) is in the active state (e.g., "Yes" in operation 701), in operation 703, the electronic device (e.g., the processor 120 or 310) may identify a folding angle of the electronic device by using a sensor (e.g., the first sensor 340 or the second sensor 350) of the electronic device. According to an embodiment, when the first display 320 and/or the second display 330 is in the active state, the processor 310 (e.g., the application processor and/or the sensor hub processor) may detect the folding angle of the electronic device by using the first sensor 340, the second sensor 350, and/or the magnetic detection sensor (e.g., a Hall IC).

According to various embodiments, when the first display (e.g., the first display 230 or 320) and the second display (e.g., the second display 235 or 330) are in an inactive state (e.g., "No" in operation 701), in operation 705, the electronic device (e.g., the processor 120 or 310) may identify a folding angle of the electronic device by using a part (e.g., the first acceleration sensor and the second acceleration sensor) of the sensor (e.g., the first sensor 340 and the second sensor 350) of the electronic device. According to an embodiment, when the first display 320 and the second display 330 are in the inactive state, the processor 310 (e.g., the sensor hub processor) may detect the folding angle of the electronic device by using the first acceleration sensor of the first sensor 340 and the second acceleration sensor of the second sensor 350. For example, the inactive state of the first display 320 and/or the second display 330 may include a state in which at least one pixel of the display (e.g., the first display 320 and/or the second display 330) is activated or a state in which all pixels of the display are inactivated. For example, the state in which at least one pixel of the display (e.g., the first display 320 and the second display 330) is activated may include a state in which power is applied to the display (e.g., the first display 320 and the second display 330), but only at least one pixel is activated and a scan rate is relatively low. For example, when the first display 320 and the second display 330 are in the inactive state, the application processor of the processor 310 may be inactivated, and the sensor hub processor may control the first sensor 340 and/or the second sensor 350.

Figure 8:
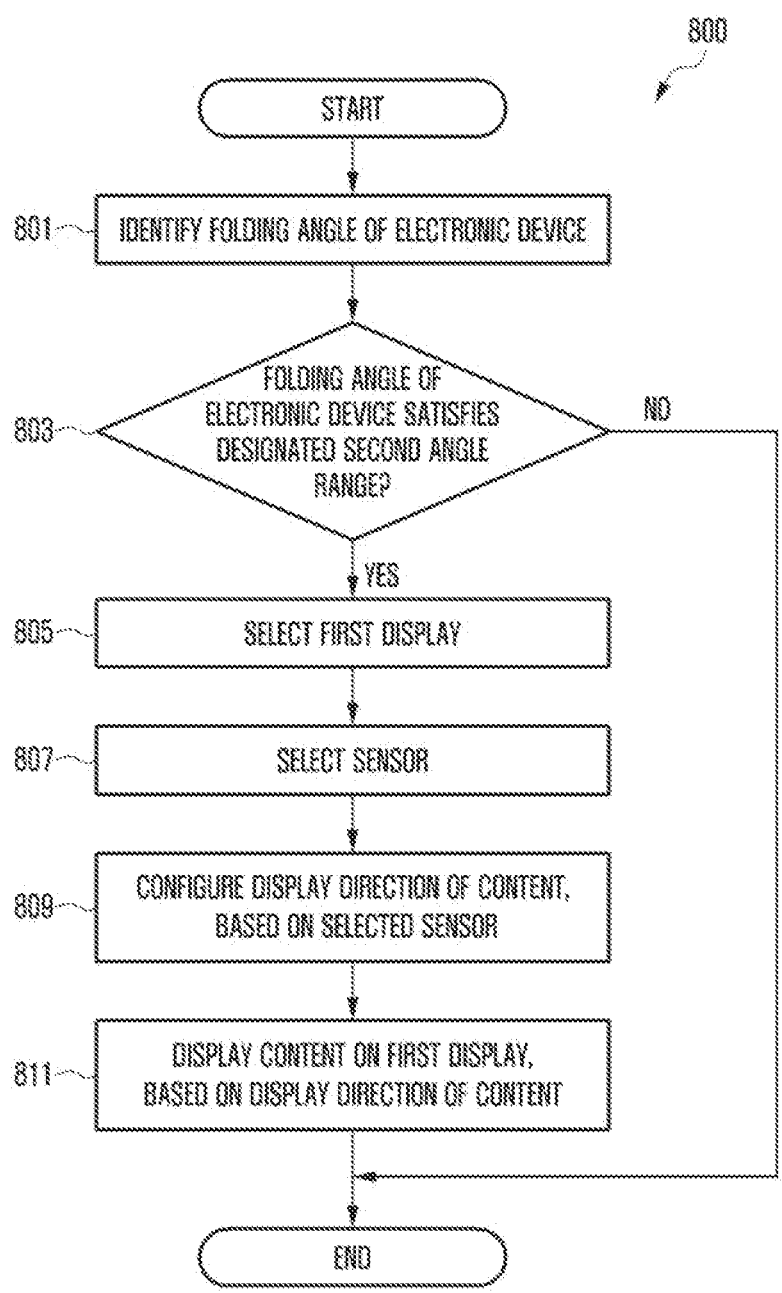
FIG. 8 is a flowchart of configuring a display direction of a first display in an electronic device in an intermediate state according to various embodiments.
Figure 9A:
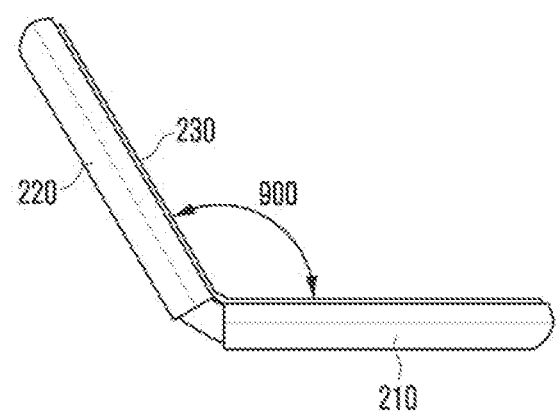
FIGS. 9A and 9B illustrate an example of switching a display direction of a first display in an electronic device in an intermediate state according to various embodiments.
Figure 9B:
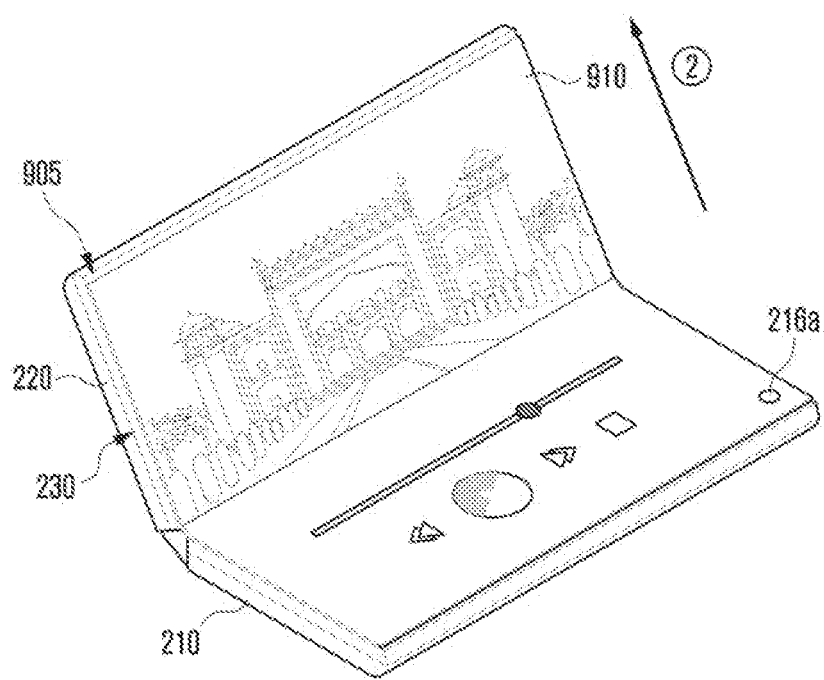
Figure 10A:
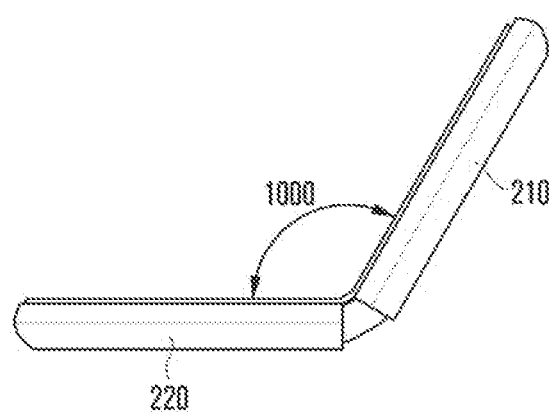
FIGS. 10A and 10B illustrate another example of switching a display direction of a first display in an electronic device in an intermediate state according to various embodiments.
Figure 10B:
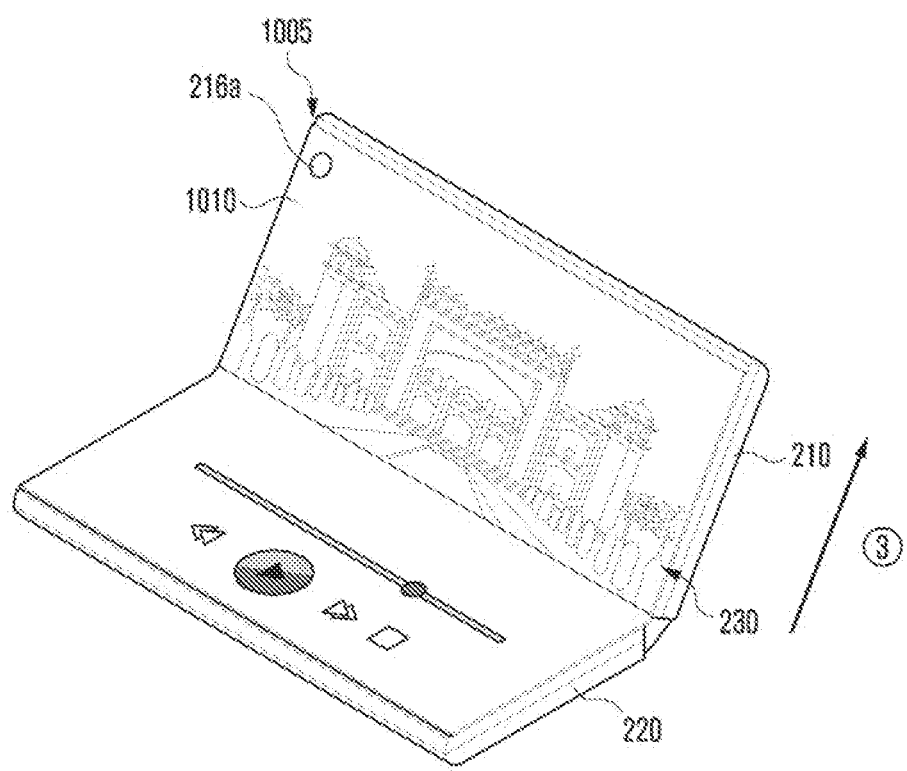
Figure 11:
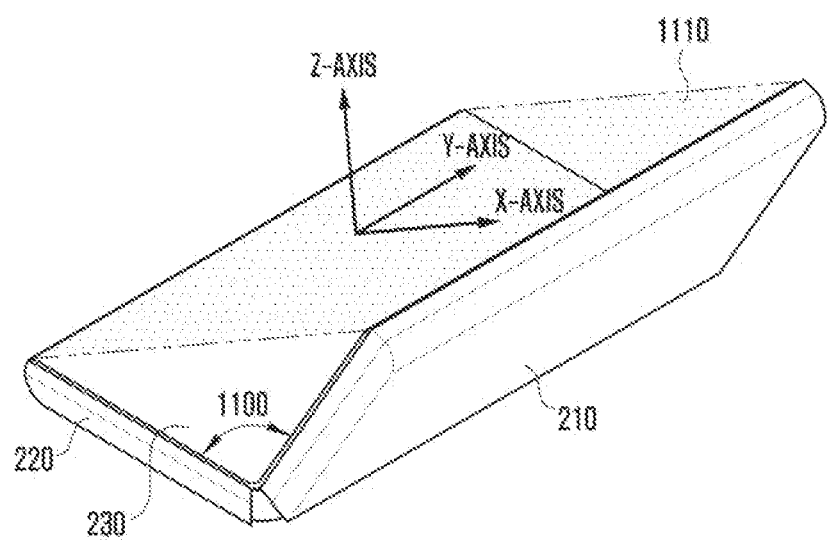
FIG. 11 illustrates an example of configuring a display direction of a first display in an electronic device in an intermediate state according to various embodiments.

FIG. 8 is a flowchart 800 related to configuring a display direction of a first display in an electronic device in an intermediate state according to various embodiments. In the following embodiments, operations may be performed sequentially, but are not necessarily performed sequentially. For example, the order of the operations may be changed, and multiple operations such as at least two operations may be performed in parallel. An electronic device of FIG. 8 may be, for example, the electronic device 101 of FIG. 1, the electronic device 200 of FIG. 2A, the electronic device 300 of FIG. 3, or another embodiment of an electronic device. For example, at least some configurations of FIG. 8 will be described with reference to FIGS. 9A, 9B, 10A, 10B, and 11. FIGS. 9A and 9B illustrate an example of switching a display direction of a first display in an electronic device in an intermediate state according to various embodiments. FIGS. 10A and 10B illustrate another example of switching a display direction of a first display in an electronic device in an intermediate state according to various embodiments. FIG. 11 illustrates an example of configuring a display direction of a first display in an electronic device in an intermediate state according to various embodiments.

Referring to FIG. 8, according to various embodiments, in operation 801, an electronic device (e.g., the processor 120 of FIG. 1 or the processor 310 of FIG. 3) may identify a folding angle of the electronic device. According to an embodiment, when the first display 320 and/or the second display 330 is in an active state, the processor 310 may detect the folding angle of the electronic device by using the first sensor 340, the second sensor 350, and the magnetic detection sensor. According to an embodiment, when the first display 320 and the second display 330 are in an inactive state, the processor 310 may detect the folding angle of the electronic device by using a part (e.g., the first acceleration sensor) of the first sensor 340 and a part (e.g., the second acceleration sensor) of the second sensor 350.

According to various embodiments, in operation 803, the electronic device (e.g., the processor 120 or 310) may identify whether the folding angle of the electronic device satisfies a designated second range (e.g., from about 75 degrees to about 170 degrees). According to an embodiment, as shown in FIG. 9A, when a folding angle 900 between the first housing 210 and the second housing 220 is included in the designated second range, the processor 310 may determine that the folding angle satisfies the designated second range. According to an embodiment, as shown in FIG. 10A, when a folding angle 1000 between the first housing 210 and the second housing 220 is included in the designated second range, the processor 310 may determine that the folding angle satisfies the designated second range. According to an embodiment, as shown in FIG. 11, when a folding angle 1100 between the first housing 210 and the second housing 220 is included in the designated second range, the processor 310 may determine that the folding angle satisfies the designated second range.

According to various embodiments, when the folding angle of the electronic device satisfies the designated second range (e.g., "Yes" in operation 803), in operation 805, the electronic device (e.g., the processor 120 or 310) may select a first display (e.g., the first display 230 of FIG. 2A or the first display 320 of FIG. 3) as a display for displaying a content. According to an embodiment, when the first display 320 is selected as the display for displaying a content, power may be supplied to the first display. In this case, a power supply to the second display 330 may be cut off.

According to various embodiments, in operation 807, the electronic device (e.g., the processor 120 or 310) may select a sensor to be used to detect rotation of the electronic device. According to an embodiment, the processor 310 may select a sensor included in a housing which is not placed on (or in contact with) a horizontal plane. For example, as shown in FIG. 9A, when the folding angle 900 between the first housing 210 and the second housing 220 is included in the designated second range and a second surface (e.g., the second surface 212 of FIG. 2A) of the first housing 210 is placed on (or in contact with) the horizontal plane, the processor 310 may select the second sensor 350 as the sensor to be used to detect rotation of the electronic device 300. For example, when the folding angle of the electronic device is included in a designated third range of the vertical axis (e.g., the Z-axis in FIG. 2A), the transverse axis (e.g., the X-axis in FIG. 2A), and the longitudinal axis (e.g., the Y-axis in FIG. 2A) of the first sensor 340, the processor 310 may determine that the second surface of the first housing is in a state of being placed on (or in contact with) the horizontal plane. For example, as shown in FIG. 10A, when the folding angle 1000 between the first housing 210 and the second housing 220 is included in the designated second range and a fourth surface (e.g., the fourth surface 222 of FIG. 2A) of the second housing 220 is placed on (or in contact with) the horizontal plane, the processor 310 may select the first sensor 340 as the sensor to be used to detect rotation of the electronic device 300. For example, when the folding angle of the electronic device is included in a designated third range of the vertical axis (e.g., the Z-axis in FIG. 2A), the transverse axis (e.g., the X-axis in FIG. 2A), and the longitudinal axis (e.g., the Y-axis in FIG. 2A) of the second sensor 350, the processor 310 may determine that the fourth surface of the second housing is in a state of being placed on (or in contact with) the horizontal plane. For example, as shown in FIG. 11, when the folding angle 1100 between the first housing 210 and the second housing 220 is included in the designated second range and one surface of the first housing 210 and the second housing 220 is not placed on (or in contact with) the horizontal plane, the processor 310 may select the first sensor 340 and the second sensor 350 as the sensor to be used to detect rotation of the electronic device 300. For example, the designated third range may include a range from about −25 degrees to about 25 degrees about the transverse axis (e.g., the X-axis in FIG. 2A), a range from about −12 degrees to about 12 degrees about the longitudinal axis (e.g., the Y-axis in FIG. 2A), and a range from about 65 degrees to about 90 degrees about the vertical axis (e.g., the Z-axis in FIG. 2A).

According to various embodiments, in operation 809, the electronic device (e.g., the processor 120 or 310) may configure a display direction of a content, based on a first sensor (e.g., the first inertial sensor 283a of FIG. 2A or the first sensor 340 of FIG. 3) and/or a second sensor (e.g., the second inertial sensor 283b of FIG. 2A or the second sensor 350 of FIG. 3) selected to detect rotation of the electronic device.

According to an embodiment, as shown in FIG. 9A, when the second sensor 350 disposed in the second housing 220 is selected to detect rotation of the electronic device 300, the processor 310 may detect an orientation angle of the electronic device 300, based on sensor data collected through the second sensor 350. For example, the processor 310 may configure a second direction (e.g., direction ② in FIG. 9B) oriented from the folding area 230c (e.g., the hinge module 264 of FIG. 2D) toward the second housing 220 as the display direction of the content, based on the orientation angle of the electronic device 300.

According to an embodiment, as shown in FIG. 10A, when the first sensor 340 disposed in the first housing 210 is selected to detect rotation of the electronic device 300, the processor 310 may detect an orientation angle of the electronic device 300 based on sensor data collected through the first sensor 340. For example, the processor 310 may configure a third direction (e.g., direction ③ in FIG. 10B) oriented from the folding area 230c (e.g., the hinge module 264 of FIG. 2D) toward the first housing 210 as the display direction of the content, based on the orientation angle of the electronic device 300.

According to an embodiment, as shown in FIG. 11, when the first sensor 340 and the second sensor 350 are selected to detect rotation of the electronic device 300, the processor 310 may detect an orientation angle of the electronic device 300, based on sensor data collected through the first sensor 340 and the second sensor 350. For example, the processor 310 may generate a virtual plane 1110 by rotating data from the first sensor 340 (e.g., the first acceleration sensor) in a fourth direction (e.g., the − direction or clockwise) with reference to the longitudinal axis (e.g., the Y-axis in FIG. 2A) by a correction angle, and rotating data from the second sensor 350 (e.g., the second acceleration sensor) in a fifth direction (e.g., the + direction or anticlockwise) with reference to the longitudinal axis (e.g., the Y-axis in FIG. 2A) by the correction angle. The processor 310 may detect the orientation angle of the electronic device 300 with reference to the virtual plane 1110. For example, the processor 310 may detect the orientation angle of the electronic device 300, based on a change in the transverse axis (e.g., the X-axis in FIG. 2A) and the longitudinal axis (e.g., the Y-axis in FIG. 2A) with reference to the virtual plane 1110. For example, the correction angle may include half of the folding angle of the electronic device 300. For example, the processor 310 may rotate data from the first acceleration sensor and/or the second acceleration sensor by using a rotation matrix. For example, the processor 310 may configure the display direction of the content, based on the orientation angle of the electronic device 300.

According to various embodiments, in operation 811, the electronic device (e.g., the processor 120 or 310) may display the content on the first display (e.g., the first display 230 of FIG. 2A or the first display 320 of FIG. 3), based on the display direction of the content. According to an embodiment, the processor 310 may generate information related to the content to be displayed on the first display 320, based on the display direction of the content. For example, as shown in FIG. 9B, the processor 310 may draw the information related to the content in the buffer of the first display 320 such that the content starts from a third point 905, based on the second direction (e.g., direction ② in FIG. 9B) which is the display direction of the content. For example, as shown in FIG. 10B, the processor 310 may draw the information related to the content in the buffer of the first display 320 such that the content starts from a fourth point 1005, based on the third direction (e.g., direction ③ in FIG. 10B) which is the display direction of the content. For example, the information related to the content may be generated based on the size of a display area (e.g., screen) for displaying the content, a start position of the content, and/or a display direction of the content. According to an embodiment, as shown in FIG. 9B, the first display 320 may display a content 910, based on the second direction (e.g., direction ②) oriented from the folding area 230c (e.g., the hinge module 264 of FIG. 2D) toward the second housing 220. For example, the first display 320 may output, to the display panel, the information related to the content drawn in the buffer of the first display 320 by the processor 310 based on the second direction ②. For example, the first display 320 may output the information related to the content to the display panel from the third point 905. For example, the processor 310 may control the first display 320 such that a video content is displayed to be oriented in the second direction (e.g., direction ②) in a second area (e.g., the second area 231b of FIG. 2D) of the first display 320. For example, the processor 310 may control the first display 320 to display another content (e.g., a control menu related to a video content) in a first area (e.g., the first area 231a of FIG. 2D) of the first display 320.

According to an embodiment, as shown in FIG. 10B, the first display 320 may display a content 1010, based on the third direction (e.g., direction ③) oriented from the folding area 230c (e.g., the hinge module 264 of FIG. 2D) toward the first housing 210. For example, the first display 320 may output, to the display panel, information related to the content drawn in the buffer of the first display 320 by the processor 310 based on the third direction ③. For example, the first display 320 may output the information related to the content to the display panel from the fourth point 1005. For example, the processor 310 may control the first display 320 such that a video content is displayed to be oriented in the third direction (e.g., direction ③) in the first area (e.g., the first area 231a of FIG. 2D) of the first display 320. For example, the processor 310 may control the first display 320 to display another content (e.g., a control menu related to a video content) in the second area (e.g., the second area 231b of FIG. 2D) of the first display 320.

According to various embodiments, the electronic device 300 may be changed from a state where the second surface (e.g., the second surface 212 of FIG. 2A) of the first housing 210 is placed on the horizontal plane as shown in FIG. 9A to a state where the fourth surface (e.g., the fourth surface 222 of FIG. 2A) of the second housing 220 is placed on the horizontal plane as shown in FIG. 10A. In this case, the electronic device 300 may switch the display direction of the video content from a state in which the content is displayed to be oriented in the second direction in the second area (e.g., the second area 231b of FIG. 2D) of the first display 320 as shown in FIG. 9B to a state in which the content is displayed to be oriented in the third direction in the first area (e.g., the first area 231a of FIG. 2D) of the first display 320 as shown in FIG. 10B. According to an embodiment, when the electronic device 300 is switched from a state where the fourth surface (e.g., the fourth surface 222 of FIG. 2A) of the second housing 220 is placed on the horizontal plane as shown in FIG. 10A to a state where the second surface (e.g., the second surface 212 of FIG. 2A) of the first housing 210 is placed on the horizontal plane as shown in FIG. 9A, the electronic device 300 may switch the display direction of the video content from a state in which the content is displayed to be oriented in the third direction ③ in the first area (e.g., the first area 231a of FIG. 2D) of the first display 320 as shown in FIG. 10B to a state in which the content is displayed to be oriented in the second direction ② in the second area (e.g., the second area 231b of FIG. 2D) of the first display 320 as shown in FIG. 9B.

Figure 12:
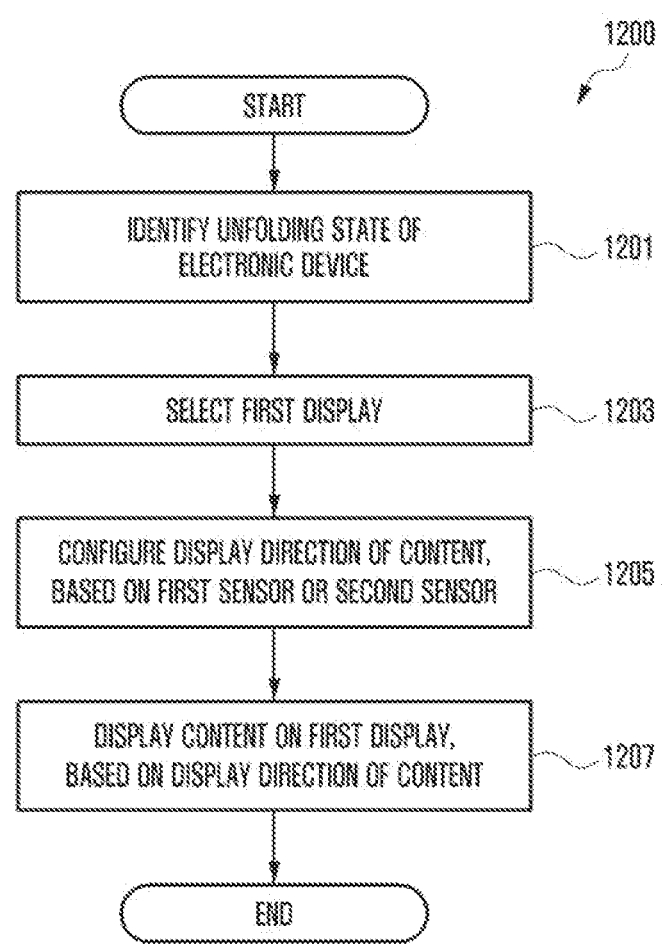
FIG. 12 is a flowchart of configuring a display direction of a first display in an electronic device in an unfolded state according to various embodiments.
Figure 13A:
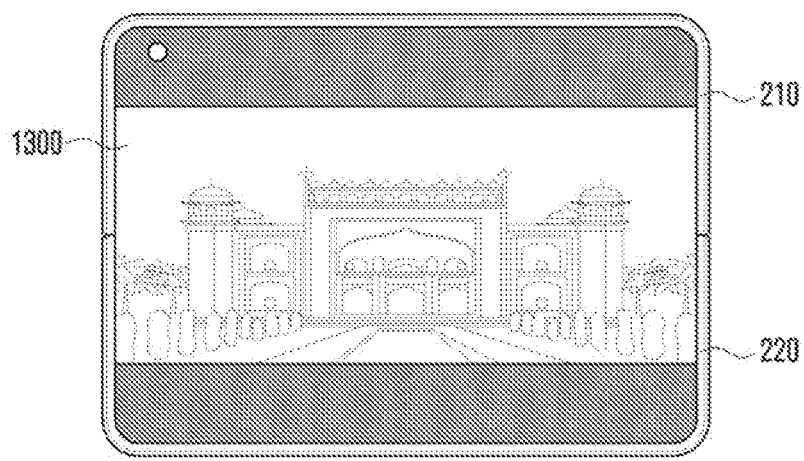
FIGS. 13A and 13B illustrate an example of switching a display direction of a first display in an electronic device in an unfolded state according to various embodiments.
Figure 13B:
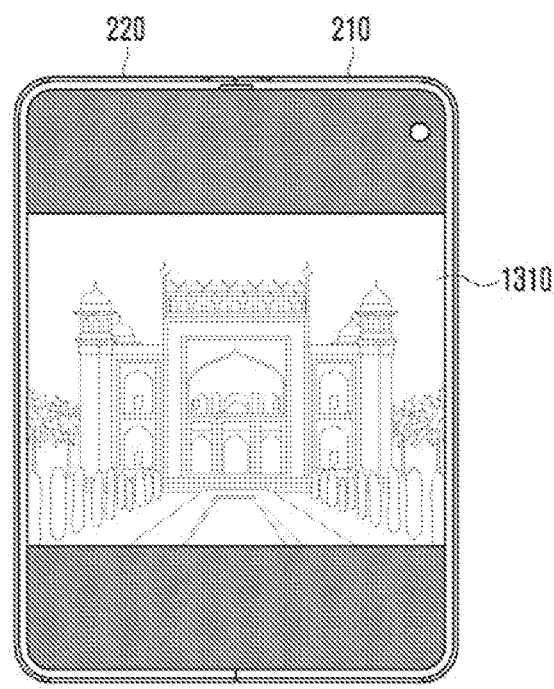

FIG. 12 is a flowchart 1200 related to configuring a display direction of a first display in an electronic device in an unfolded state according to various embodiments. In the following embodiments, operations may be performed sequentially, but are not necessarily performed sequentially. For example, the order of the operations may be changed, and multiple operations such as at least two operations may be performed in parallel. An electronic device of FIG. 12 may be, for example, the electronic device 101 of FIG. 1, the electronic device 200 of FIG. 2A, the electronic device 300 of FIG. 3, or another embodiment of an electronic device. At least some configurations of FIG. 12 will be described with reference to FIGS. 13A and 13B. FIGS. 13A and 13B illustrate an example of switching a display direction of a first display in an electronic device in an unfolded state according to various embodiments.

Referring to FIG. 12, according to various embodiments, in operation 1201, an electronic device (e.g., the processor 120 of FIG. 1 or the processor 310 of FIG. 3) may identify an unfolded state of the electronic device. According to an embodiment, when a folding angle between the first housing 210 and the second housing 220 is included in a first reference range (e.g., from about 170 degrees to about 180 degrees), the processor 310 may determine that the electronic device 300 is in the unfolded state. For example, as in operations 701 to 703 of FIG. 7, when the first display 320 and/or the second display 330 is in an active state, the processor 310 (e.g., the application processor and/or the sensor hub processor) may detect a folding angle of the electronic device by using the first sensor 340, the second sensor 350, and/or the magnetic detection sensor (e.g., a Hall IC). For example, as in operations 701 and 705 of FIG. 7, when the first display 320 and the second display 330 are in an inactive state, the processor 310 (e.g., the sensor hub processor) may detect the folding angle of the electronic device by using the first acceleration sensor of the first sensor 340 and the second acceleration sensor of the second sensor 350.

According to various embodiments, in operation 1203, the electronic device (e.g., the processor 120 or 310) may select a first display (e.g., the first display 230 of FIG. 2A or the first display 320 of FIG. 3) as a display for displaying a content, based on the unfolded state of the electronic device.

According to various embodiments, in operation 1205, the electronic device (e.g., the processor 120 or 310) may configure a display direction of a content by using on a first sensor (e.g., the first inertial sensor 283a of FIG. 2A or the first sensor 340 of FIG. 3) or a second sensor (e.g., the second inertial sensor 283b of FIG. 2A or the second sensor 350 of FIG. 3). According to an embodiment, all axis directions of the first sensor 340 and the second sensor 350 may be the same when the electronic device 300 is in the unfolded state. Accordingly, when the electronic device 300 is in the unfolded state, the processor 310 may detect an orientation angle of the electronic device 300, based on sensor data collected through the first sensor 340 (e.g., the first acceleration sensor) or the second sensor 350 (e.g., the second acceleration sensor). For example, the processor 310 may configure the display direction of the content, based on the orientation angle of the electronic device 300. For example, the sensor data may include data related to a change in the longitudinal axis (e.g., the Y-axis in FIG. 2A) and the transverse axis (e.g., the X-axis in FIG. 2A) of the first acceleration sensor or the second acceleration sensor.

According to various embodiments, in operation 1207, the electronic device (e.g., the processor 120 or 310) may display the content on the first display (e.g., the first display 230 of FIG. 2A or the first display 320 of FIG. 3), based on the display direction of the content. According to an embodiment, as shown in FIG. 13A, when the orientation angle of the electronic device 300 is landscape, the processor 310 may control the first display 320 to display a content 1300, based on the display direction of the content. According to an embodiment, as shown in FIG. 13B, when the orientation angle of the electronic device 300 is portrait, the processor 310 may control the first display 320 to display a content 1310, based on the display direction of the content.

According to various embodiments, in the case of changing from the landscape direction as shown in FIG. 13A to the portrait direction as shown in FIG. 13B, the electronic device may switch the display direction of the content from a state in which the content 1300 is displayed to correspond to the landscape direction as shown in FIG. 13A to a state in which the content 1310 is displayed to correspond to the portrait direction as shown in FIG. 13B.

Figure 14:
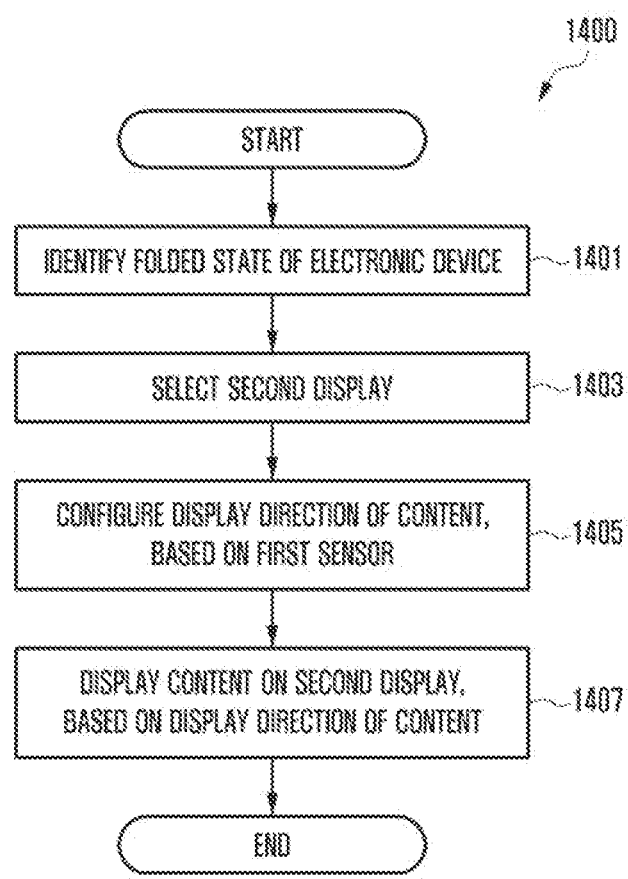
FIG. 14 is a flowchart of configuring a display direction of a second display in an electronic device in a folded state according to various embodiments.
Figure 15A:
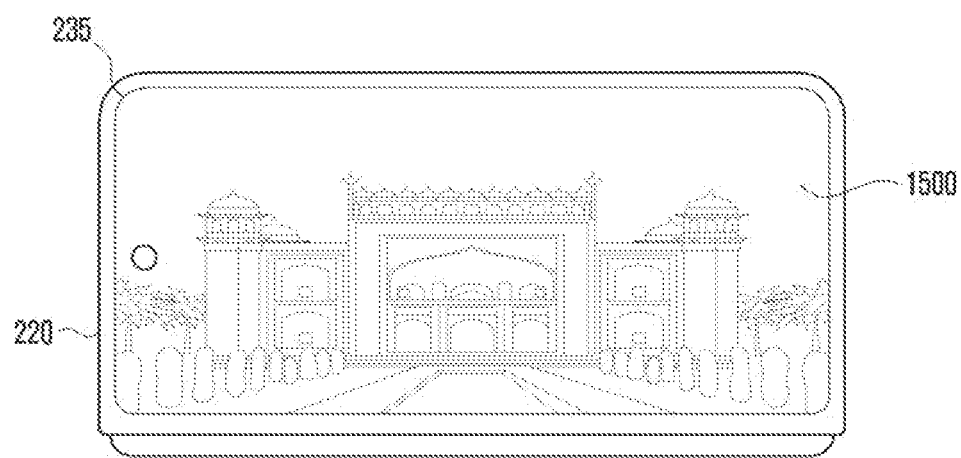
FIGS. 15A and 15B illustrate an example of switching a display direction of a second display in an electronic device in a folded state according to various embodiments.
Figure 15B:
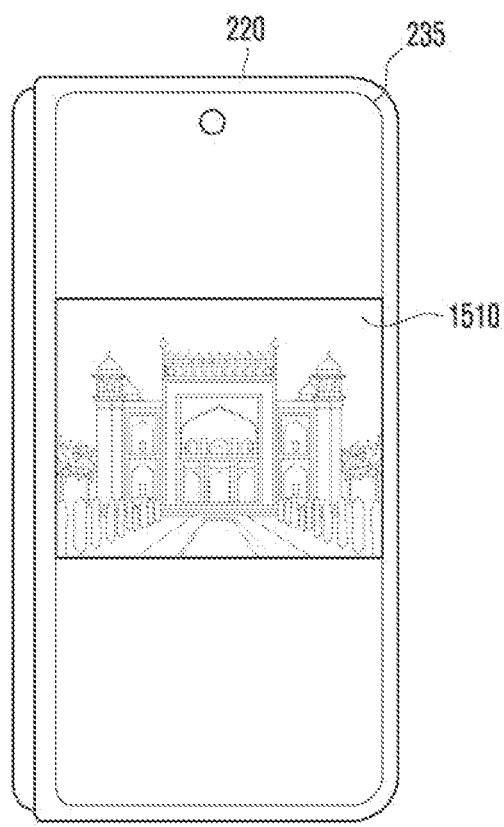

FIG. 14 is a flowchart 1400 related to configuring a display direction of a second display in an electronic device in a folded state according to various embodiments. In the following embodiments, operations may be performed sequentially, but are not necessarily performed sequentially. For example, the order of the operations may be changed, and multiple operations such as at least two operations may be performed in parallel. For example, an electronic device of FIG. 14 may be the electronic device 101 of FIG. 1, the electronic device 200 of FIG. 2A, the electronic device 300 of FIG. 3, or another embodiment of an electronic device. For example, at least some configurations of FIG. 14 will be described with reference to FIGS. 15A and 15B. FIGS. 15A and 15B illustrate an example of switching a display direction of a second display in an electronic device in a folded state according to various embodiments.

Referring to FIG. 14, according to various embodiments, in operation 1401, an electronic device (e.g., the processor 120 of FIG. 1 or the processor 310 of FIG. 3) may identify a folded state of the electronic device. According to an embodiment, when a folding angle between the first housing 210 and the second housing 220 is included in a second reference range (e.g., from about 0 degrees to about 20 degrees), the processor 310 may determine that the electronic device 300 is in the folded state. For example, as in operations 701 to 703 of FIG. 7, when the first display 320 and/or the second display 330 is in an active state, the processor 310 (e.g., the application processor and/or the sensor hub processor) may detect a folding angle of the electronic device by using the first sensor 340, the second sensor 350, and the magnetic detection sensor (e.g., a Hall IC). For example, as in operations 701 and 705 of FIG. 7, when the first display 320 and the second display 330 are in an inactive state, the processor 310 (e.g., the sensor hub processor) may detect the folding angle of the electronic device by using the first acceleration sensor of the first sensor 340 and the second acceleration sensor of the second sensor 350.

According to various embodiments, in operation 1403, the electronic device (e.g., the processor 120 or 310) may select a second display (e.g., the second display 235 of FIG. 2A or the second display 330 of FIG. 3) as a display for displaying a content, based on the folded state of the electronic device.

According to various embodiments, in operation 1405, the electronic device (e.g., the processor 120 or 310) may configure a display direction of a content by using a first sensor (e.g., the first inertial sensor 283a of FIG. 2A or the first sensor 340 of FIG. 3). According to an embodiment, since the second display 330 selected to display a content while the electronic device 300 is in the folded state corresponds to the direction (e.g., the Z-axis) of the vertical axis of the first sensor 340, the processor 310 may select the first sensor 340 as a sensor to be used to detect rotation of the electronic device 300. According to an embodiment, the processor 310 may detect an orientation angle of the electronic device 300, based on sensor data collected through the first sensor 340 (e.g., the first acceleration sensor). For example, the processor 310 may configure the display direction of the content, based on the orientation angle of the electronic device 300. For example, the sensor data may include data related to a change in the longitudinal axis (e.g., the Y-axis in FIG. 2A) and the transverse axis (e.g., the X-axis in FIG. 2A) of the first acceleration sensor.

According to various embodiments, in operation 1407, the electronic device (e.g., the processor 120 or 310) may display the content on the second display (e.g., the second display 235 of FIG. 2A or the second display 330 of FIG. 3), based on the display direction of the content. According to an embodiment, as shown in FIG. 15A, when the orientation angle of the electronic device 300 is landscape, the processor 310 may control the second display 330 (e.g., the second display 235 of FIG. 2A) to display a content 1500, based on the display direction of the content. According to an embodiment, as shown in FIG. 15B, when the orientation angle of the electronic device 300 is portrait, the processor 310 may control the second display 330 to display a content 1510, based on the display direction of the content.

According to an embodiment, when changing from the portrait direction as shown in FIG. 15B to the landscape direction as shown in FIG. 15A, the electronic device 300 may switch the display direction of the content from a state in which the content 1510 is displayed to correspond to the portrait direction as shown in FIG. 15B to a state in which the content 1500 is displayed to correspond to the landscape direction as shown in FIG. 15A.

According to various embodiments of the disclosure, an operation method of an electronic device (e.g., the electronic device 101 of FIG. 1, the electronic device 200 of FIG. 2A, or the electronic device 300 of FIG. 3) may include identifying, by a first sensor (e.g., the sensor module 176 of FIG. 1, the first inertial sensor 283a of FIG. 2A, or the first sensor 340 of FIG. 3) and a second sensor (e.g., the sensor module 176 of FIG. 1, the second inertial sensor 283b of FIG. 2A, or the second sensor 350 of FIG. 3), a folding angle between a first housing (e.g., the first housing 210 of FIG. 2A) and a second housing (e.g., the second housing 220 of FIG. 2A), the first sensor being disposed in a first space of the first housing which is connected to a hinge module (e.g., the hinge module 264 of FIG. 2D) and includes a first surface (e.g., the first surface 211 of FIG. 2A), a second surface (e.g., the second surface 212 of FIG. 2A) facing a direction opposite to the first surface, and a first lateral surface (e.g., the first lateral member 213 of FIG. 2A) surrounding the first space between the first surface and the second surface, the second sensor being disposed in a second space of the second housing which is connected to the hinge module so as to be foldable with respect to the first housing and, in an unfolded state, includes a third surface (e.g., the third surface 221 of FIG. 2A) facing the same direction as the first surface, a fourth surface (e.g., the fourth surface 222 of FIG. 2A) facing a direction opposite to the third surface, and a second lateral surface (e.g., the second lateral surface 223 of FIG. 2A) surrounding the second space between the third surface and the fourth surface, when the folding angle between the first housing and the second housing satisfies a designated first range, from among a first display (e.g., the display module 160 of FIG. 1, the first display 230 of FIG. 2A, or the first display 320 of FIG. 3) disposed from at least a part of the first surface to at least a part of the third surface, and a second display (e.g., the display module 160 of FIG. 1, the second display 235 of FIG. 2A, or the second display 330 of FIG. 3) disposed in the second space so as to be visible from the outside through at least a part of the fourth surface, selecting the second display, determining a display direction of a content, based on sensor data collected through the second sensor, and displaying the content on the second display, based on the display direction of the content.

According to various embodiments, the identifying of the folding angle may include identifying the folding angle between the first housing and the second housing by using the first sensor, the second sensor, and a magnetic detection sensor when the first display and/or the second display is in an active state, or identifying the folding angle between the first housing and the second housing through a part of the first sensor and a part of the second sensor when the first display and the second display are in an inactive state.

According to various embodiments, the first sensor and/or the second sensor may include an acceleration sensor and a gyro sensor, and the part of the first sensor and/or the second sensor may include the acceleration sensor.

According to various embodiments, the method may further include selecting the second display when the first housing and the second housing are determined as being in a folded state, based on the folding angle between the first housing and the second housing, determining the display direction of the content, based on sensor data collected through the first sensor, and displaying the content on the second display, based on the display direction of the content.

According to various embodiments, the method may further include selecting the first display when the first housing and the second housing are determined as being in the unfolded state, based on the folding angle between the first housing and the second housing, determining the display direction of the content, based on sensor data collected through the first sensor and/or the second sensor, and displaying the content on the first display, based on the display direction of the content.

According to various embodiments, the determining of the display direction may include, when the first display is in an active state in a state where the first housing and the second housing are in the unfolded state, determining the display direction of the content, based on the sensor data collected through the first sensor and the second sensor, or when the first display is in an inactive state in a state where the first housing and the second housing are in the unfolded state, determining the display direction of the content, based on the sensor data collected through the first sensor or the second sensor.

According to various embodiments, the method may include selecting the first display when the folding angle between the first housing and the second housing satisfies a designated second range different from the designated first range, determining the display direction of the content, based on sensor data collected through the first sensor and/or the second sensor, and displaying the content on the first display, based on the display direction of the content.

According to various embodiments, the determining of the display direction of the content may include, when the sensor data collected through the first sensor satisfies a designated first condition, determining the display direction of the content, based on the sensor data collected through the second sensor, or when the sensor data collected through the second sensor satisfies the designated first condition, determining the display direction of the content, based on the sensor data collected through the first sensor.

According to various embodiments, the determining of the display direction of the content may include, when the sensor data collected through the first sensor and the second sensor does not satisfy the designated first condition, determining the display direction of the content, based on the sensor data collected through the first sensor and the second sensor.

According to various embodiments, the displaying of the content on the second display may include displaying a content related to an application program when the second display is in an active state, or displaying a content related to a low power display mode when the second display is in an inactive state.

While embodiments have been particularly shown and described above, it will be understood that various changes in form and details may be made therein without departing from the spirit and scope of the following claims.

What is claimed is:

1. An electronic device comprising:
   a first housing comprising a first surface and a second surface opposite to the first surface;
   a second housing comprising a third surface and a fourth surface opposite to the third surface;
   a hinge structure foldably connecting the first housing and the second housing to each other such that the first surface and the third surface face a same direction when the first housing and the second housing are in an unfolded state;
   a first display disposed from at least a part of the first surface to at least a part of the third surface;
   a second display disposed in the second housing so as to be visible from an outside through at least a part of the fourth surface;
   a first sensor disposed at least partly in the first housing and configured to obtain sensor data related to movement of the first housing;
   a second sensor disposed at least partly in the second housing and configured to obtain sensor data related to movement of the second housing;
   a processor operatively connected with the first display, the second display, the first sensor, and the second sensor, and
   memory storing instructions which, when executed by the processor, cause the electronic device to:
   identify a folding angle between the first housing and the second housing by using the first sensor and the second sensor,
   select the second display based on the folding angle between the first housing and the second housing being in a first range,
   obtain the sensor data of the second sensor among the first sensor and the second sensor based on the folding angle between the first housing and the second housing being in the first range,
   determine a display direction of a content, based on the obtained sensor data of the second sensor, and
   display the content via the second display, based on the display direction of the content.

2. The electronic device of claim 1, further comprising a magnetic detection sensor disposed in the first housing or the second housing,
   wherein the memory stores instructions which, when executed by the processor, cause the electronic device to:
   based on at least one of the first display and the second display being in an active state, identify the folding angle between the first housing and the second housing by using the first sensor, the second sensor, and the magnetic detection sensor; and based on the first display and the second display being in an inactive state, identify the folding angle between the first housing and the second housing by using at least one of a part of the first sensor and a part of the second sensor.

3. The electronic device of claim 2, wherein at least one of the first sensor and the second sensor comprises an acceleration sensor and a gyro sensor, and wherein the at least one of the part of the first sensor or the part of the second sensor comprises the acceleration sensor.

4. The electronic device of claim 1, wherein the memory stores instructions which, when executed by processor, cause the electronic device to:

identify the first housing and the second housing being in a folded state based on the folding angle between the first housing and the second housing;

based on the first housing and the second housing being in the folded state, select the second display;

determine the display direction of the content, based on the sensor data obtained by the first sensor; and display the content via the second display, based on the display direction of the content.

5. The electronic device of claim 1, wherein the memory stores instructions which, when executed by the processor, cause the electronic device to:

identify the first housing and the second housing being in the unfolded state based on the folding angle between the first housing and the second housing;

based on the first housing and the second housing being in the unfolded state, select the first display;

determine the display direction of the content, based on at least one the sensor data obtained by the first sensor and the sensor data obtained by the second sensor; and display the content via the first display, based on the display direction of the content.

6. The electronic device of claim 5, wherein the instructions which, when executed by the processor, cause the electronic device to:

based on the first display being in an active state and the first housing and the second housing being in the unfolded state, determine the display direction of the content based on the sensor data obtained by the first sensor and the sensor data obtained by the second sensor; and based on the first display being in an inactive state and the first housing and the second housing being in the unfolded state, determine the display direction of the content based on at least one the sensor data obtained by the first sensor and the sensor data obtained by the second sensor.

7. The electronic device of claim 1, wherein the memory stores instructions which, when executed by the processor, cause the electronic device to:

select the first display based on the folding angle between the first housing and the second housing being in a second range different from the first range;

determine the display direction of the content, based on at least one of the sensor data obtained by the first sensor and the sensor data obtained by the second sensor; and display the content via the first display, based on the display direction of the content.

8. The electronic device of claim 7, wherein instructions which, when executed by the processor, cause the electronic device to:

based on the sensor data obtained by the first sensor satisfying a first condition, determine the display direction of the content based on the sensor data obtained by the second sensor; and based on the sensor data obtained by the second sensor satisfying the first condition, determine the display direction of the content based on the sensor data obtained by the first sensor.

9. The electronic device of claim 8, wherein instructions which, when executed by the processor, cause the electronic device to, based on the sensor data obtained by the first sensor and the sensor data obtained by the second sensor not satisfying the first condition, determine the display direction of the content, based on the sensor data obtained by the first sensor and the sensor data obtained by the second sensor.

10. An operation method of an electronic device comprising a first housing, a second housing, and a hinge structure foldably connecting the first housing and the second housing, the operation method comprising:

identifying, by a first sensor and a second sensor, a folding angle between the first housing and the second housing, the first sensor being disposed in the first housing which comprises a first surface and a second surface facing a direction opposite to the first surface, the second sensor being disposed in the second housing which comprises a third surface facing a same direction as the first surface when the first housing and the second housing are in an unfolded state and a fourth surface opposite to the third surface;

based on the folding angle between the first housing and the second housing satisfying a first range, selecting a second display from among a first display disposed from at least a part of the first surface to at least a part of the third surface, and the second display disposed in the second housing so as to be visible from an outside through at least a part of the fourth surface;

obtaining sensor data of the second sensor among the first sensor and the second sensor based on the folding angle between the first housing and the second housing being in the first range;

determining a display direction of a content, based on the obtained sensor data of the second sensor; and displaying the content on the second display, based on the display direction of the content.

11. The operation method of claim 10, wherein the identifying the folding angle comprises:

based on at least one of the first display and the second display being in an active state, identifying the folding angle between the first housing and the second housing by using the first sensor, the second sensor, and a magnetic detection sensor; and based on the first display and the second being are in an inactive state, identifying the folding angle between the first housing and the second housing through at least one of a part of the first sensor and a part of the second sensor.

12. The operation method of claim 11, wherein at least one of the first sensor and the second sensor comprises an acceleration sensor and a gyro sensor, and wherein at least one of the part of the first sensor or the part of the second sensor comprises the acceleration sensor.

13. The operation method of claim 10, further comprising:

identifying the first housing and the second housing being in a folded state based on the folding angle between the first housing and the second housing;

based on the first housing and the second housing being in the folded state, selecting the second display;
determining the display direction of the content, based on the sensor data obtained by the first sensor; and
displaying the content on the second display, based on the display direction of the content.

14. The operation method of claim 10, further comprising:
identifying the first housing and the second housing being in the unfolded state based on the folding angle between the first housing and the second housing;
based on the first housing and the second housing being in the unfolded state, selecting the first display;
determining the display direction of the content, based on the sensor data obtained by at least one of the first sensor and the second sensor; and
displaying the content on the first display, based on the display direction of the content.

15. The operation method of claim 10, further comprising:
selecting the first display when the folding angle between the first housing and the second housing is in a second range different from the first range;
determining the display direction of the content, based on sensor data obtained by at least one of the first sensor and the second sensor; and
displaying the content on the first display, based on the display direction of the content.

* * * * *